US012656923B2

(12) United States Patent
Lee et al.

(10) Patent No.: US 12,656,923 B2
(45) Date of Patent: Jun. 16, 2026

(54) DISPLAY DEVICE

(71) Applicant: Samsung Display Co., Ltd., Yongin-Si (KR)

(72) Inventors: Changho Lee, Hwaseong-si (KR); Il-Joo Kim, Hwaseong-si (KR); Jong-Hwa Kim, Yongin-si (KR); Wonjun Choi, Seoul (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/090,444

(22) Filed: Mar. 26, 2025

(65) Prior Publication Data

US 2025/0224844 A1    Jul. 10, 2025

Related U.S. Application Data

(63) Continuation of application No. 18/444,967, filed on Feb. 19, 2024, now Pat. No. 12,282,638, which is a
(Continued)

(30) Foreign Application Priority Data

Apr. 22, 2022    (KR) ........................ 10-2022-0050215

(51) Int. Cl.
  *G06F 3/044*        (2006.01)
  *G06F 3/041*        (2006.01)
(52) U.S. Cl.
  CPC .......... *G06F 3/0446* (2019.05); *G06F 3/0412* (2013.01); *G06F 2203/04111* (2013.01)
(58) Field of Classification Search
  CPC ................. G06F 3/0412; G06F 3/0446; G06F 2203/04111; G09G 3/364; G09G 3/2074; G09G 3/3607; G09G 2300/0443
  See application file for complete search history.

(56) References Cited

U.S. PATENT DOCUMENTS 10,395,581 B2 *  8/2019  Kim ...................... G09G 3/2074
10,559,246 B2 *  2/2020  Kim ...................... G09G 3/2003
(Continued)

FOREIGN PATENT DOCUMENTS

JP            2014-191650 A    10/2014
KR      10-2013-0078907 A     7/2013
(Continued)

OTHER PUBLICATIONS

Korean Notice of Allowance corresponding to Application No. 10-2022-0050215 and issued on Dec. 1, 2025, 7 pages.

*Primary Examiner* — Michael Pervan
(74) *Attorney, Agent, or Firm* — Innovation Counsel LLP

(57)            ABSTRACT

A display device is disclosed that includes a pixel layer, a touch sensing layer, and a sensing pattern. The pixel layer includes first pixel units, each including first sub-light emitting regions, and second pixel units, each including second sub-light emitting regions. The touch sensing layer includes sensing electrodes, and driving electrodes electrically insulated from the sensing electrodes, at least some of the sensing electrodes and the driving electrodes each includes a dummy pattern defining dummy openings overlapping the first sub-light emitting regions when viewed in a plan view, and a sensing pattern electrically insulated from the dummy pattern and spaced apart from the first sub-light emitting regions and the second sub-light emitting regions when viewed in a plan view. The light blocking pattern is disposed on the touch sensing layer, defining light blocking openings overlapping the first sub-light emitting regions when viewed in a plan view, and overlapping the first pixel units when viewed in a plan view.

13 Claims, 28 Drawing Sheets

Related U.S. Application Data continuation of application No. 18/137,567, filed on Apr. 21, 2023, now Pat. No. 11,907,490.

(56)                    References Cited

U.S. PATENT DOCUMENTS

| 11,075,364 | B2 | 7/2021 | Kim et al. | |
| 2013/0169770 | A1 | 7/2013 | Park et al. | |
| 2014/0320760 | A1 | 10/2014 | Ishizaki et al. | |
| 2017/0003786 | A1 | 1/2017 | Kim et al. | |
| 2018/0122283 | A1* | 5/2018 | Kim | G09G 3/2003 |
| 2019/0214440 | A1 | 7/2019 | Lee et al. | |
| 2019/0333438 | A1* | 10/2019 | Kim | G09G 3/2074 |

FOREIGN PATENT DOCUMENTS

| KR | 10-2017-0003388 | A | 1/2017 |
| KR | 10-2018-0045704 | A | 5/2018 |
| KR | 10-2020-0014599 | A | 2/2020 |
| KR | 10-2020-0063591 | A | 6/2020 |

* cited by examiner

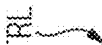
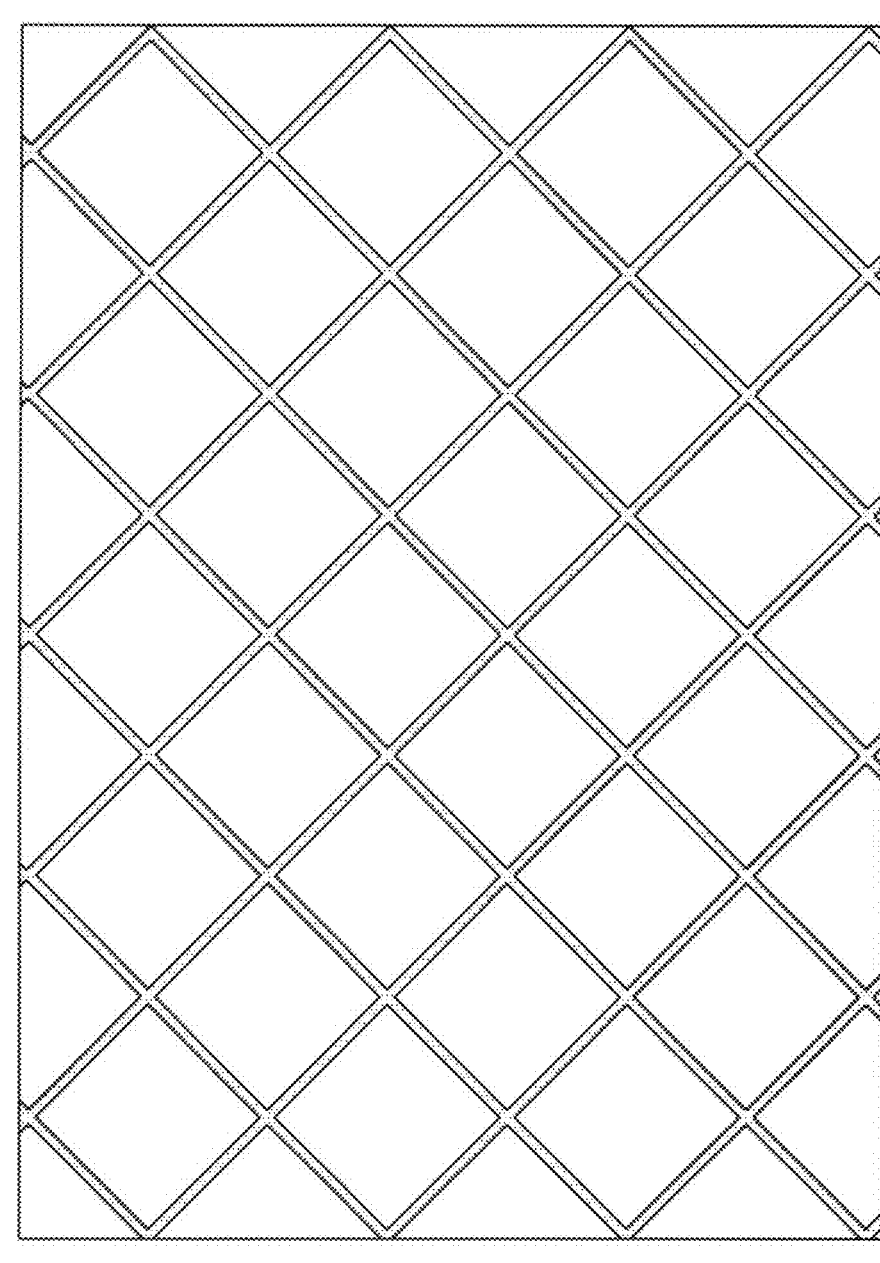
FIG. 5

BL
YIL3
OC
TRL
YIL2
YIL1
EN
E2
PDL
CIR
SUB

DPr
BLOr'
DPOr'
PX01

DPr  BL
DPr
BLOr'
DPOr'
PX01

BL
TRL
PDL

EL
E1  EL
PDL
EL  E1
E1  EL

F I G. 1 4

BR1

BR10:BR10r,BR10b,BR10g
BR1U:BR1r,BR1g,BR1b,BR11,BR12

BR1U
BR11
BR1g
BR13
BR12
BR1b
BR13

BR10r
BR13
BR1r
BR11
BR1g
BR13
BR12
DPb

BR10b

BR10g

F I G.  18

F I G.  20

DP

DP0:DP0r,DP0b,DP0g

DP0r

DPr

DP0g

DPg

DPg

DP0b

DPb

Figure 25:
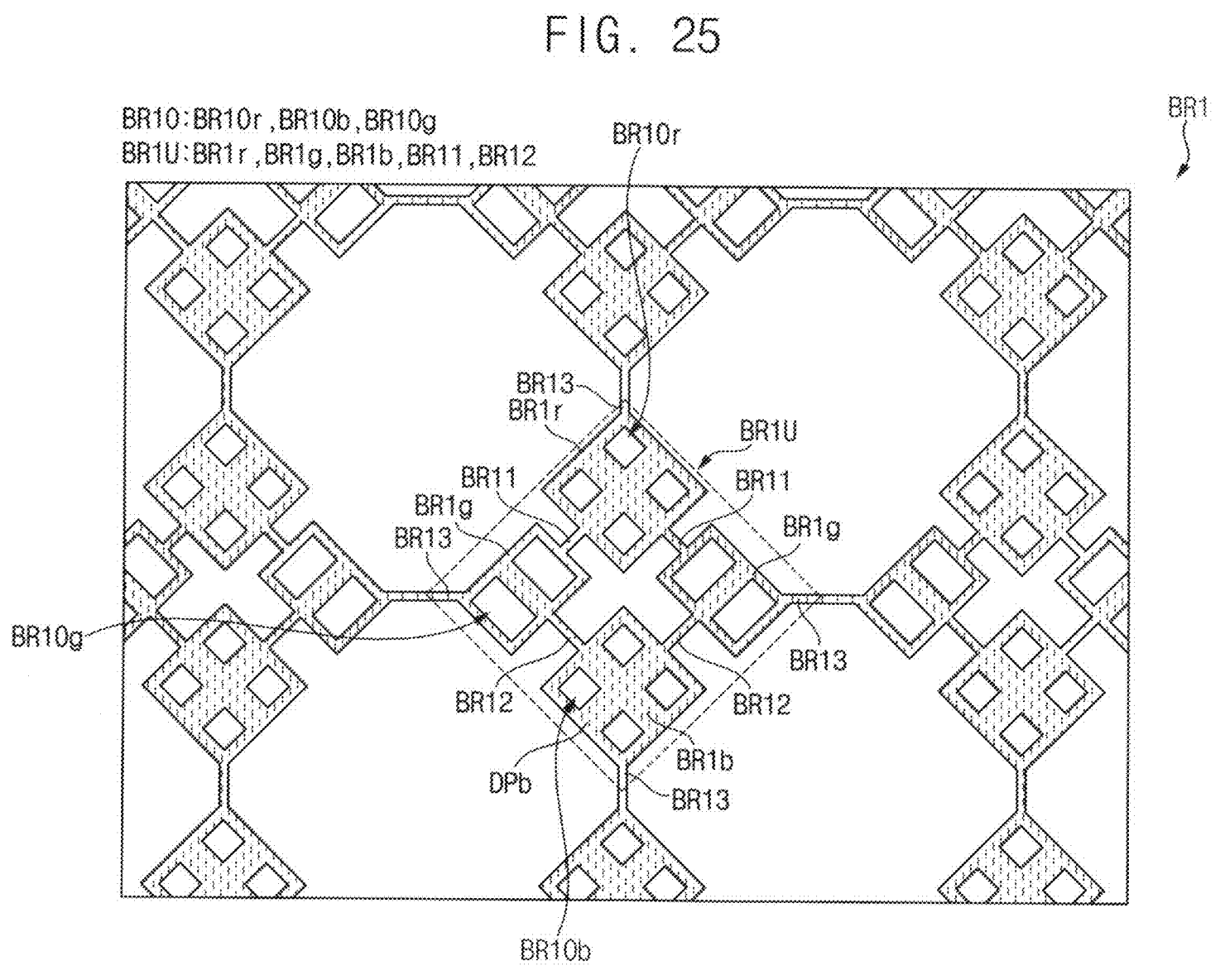

BR13
BR1r
BR11
BR1g
BR13
BR12
DPb
BR10b

DP":DPr",DPg",DPb"

DISPLAY DEVICE

CROSS-REFERENCE TO RELATED APPLICATION

This application is a continuation application of U.S. patent application Ser. No. 18/444,967 filed on Feb. 19, 2024, now U.S. Pat. No. 12,282,638, which is a continuation application of U.S. patent application Ser. No. 18/137,567 filed on Apr. 21, 2023, now U.S. Pat. No. 11,907,490, which claims priority to and the benefit of Korean Patent Application No. 10-2022-0050215 filed in the Korean Intellectual Property Office filed on Apr. 22, 2022, the disclosures of which are incorporated by reference herein in their entireties.

BACKGROUND

1. Field

The present disclosure relates to a display device.

2. Description of the Related Art

In general, a light emitted from a display device may have a relatively wide viewing angle. In other words, a user of the display device may view an image displayed on the display device on a front side and a lateral side of the display device.

However, in this case, a person other than the user of the display device may view the image displayed on the display device in a public place. Accordingly, privacy of the user of the display device may be exposed.

SUMMARY

Embodiments of the present disclosure may provide a display device capable of adjusting a viewing angle.

An embodiment of a display device includes: a pixel layer including a plurality of first pixel units, at least some of a plurality of first sub-light emitting regions, and a plurality of second pixel units, each include a plurality of second sub-light emitting regions; a touch sensing layer including a plurality of sensing electrodes disposed on the pixel layer, and a plurality of driving electrodes electrically insulated from the sensing electrodes and disposed on the pixel layer; and a light blocking pattern disposed on the touch sensing layer, defining a plurality of light blocking openings overlapping the first sub-light emitting regions when viewed in a plan view, and overlapping the first pixel units when viewed in a plan view. Each of the sensing electrodes and the driving electrodes includes a dummy pattern defining a plurality of dummy openings overlapping the first sub-light emitting regions when viewed in a plan view, and a sensing pattern electrically insulated from the dummy pattern and spaced apart from the first sub-light emitting regions and the second sub-light emitting regions when viewed in a plan view.

According to an embodiment, an area of each of the light blocking openings may be greater than or equal to an area of each of the first sub-light emitting regions when viewed in a plan view.

According to an embodiment, an area of each of the dummy openings may be less than or equal to an area of each of the first sub-light emitting regions when viewed in a plan view.

According to an embodiment, at least one insulating layer may be disposed between the dummy pattern and the sensing pattern.

According to an embodiment, the dummy pattern may be spaced apart from the second pixel units when viewed in a plan view.

According to an embodiment, the dummy pattern may be spaced apart from the sensing pattern when viewed in a plan view.

According to an embodiment, the light blocking pattern may be spaced apart from the second pixel units when viewed in a plan view.

According to an embodiment, the touch sensing layer may further include a dummy sensing pattern disposed on a same layer as the sensing pattern and completely overlapping a portion of the dummy pattern when viewed in a plan view.

According to an embodiment, at least a portion of the dummy sensing pattern may be disposed between two dummy openings that are adjacent to each other among the dummy openings when viewed in a plan view.

According to an embodiment, the dummy sensing pattern may be electrically insulated from the sensing pattern.

According to an embodiment, the first sub-light emitting regions may include a plurality of first red light emitting regions, a plurality of first green light emitting regions, and a plurality of first blue light emitting regions.

According to an embodiment, the dummy pattern may include: a first dummy pattern defining a plurality of first dummy openings overlapping the first red light emitting regions; a second dummy pattern defining a plurality of second dummy openings overlapping the first green light emitting regions; and a third dummy pattern defining a plurality of third dummy openings overlapping the first blue light emitting regions.

According to an embodiment, the first dummy pattern may be spaced apart from the second dummy pattern and the third dummy pattern when viewed in a plan view, and the second dummy pattern may be spaced apart from the third dummy pattern when viewed in a plan view.

An embodiment of a display device includes: a pixel layer including a plurality of first pixel units, each including a plurality of first sub-light emitting regions, and a plurality of second pixel units, each including a plurality of second sub-light emitting regions; a plurality of sensing electrodes disposed on the pixel layer; a plurality of driving electrodes disposed on the pixel layer and electrically insulated from the sensing electrodes; a plurality of first bridge electrodes disposed on the pixel layer, electrically connecting the sensing electrodes to each other in columns, and each including a first bridge pattern defining a plurality of dummy openings overlapping the first sub-light emitting regions when viewed in a plan view; a plurality of second bridge electrodes disposed on the pixel layer, electrically connecting the driving electrodes to each other in rows, and each including a second bridge pattern spaced apart from the first sub-light emitting regions and the second sub-light emitting regions when viewed in a plan view; and a light blocking pattern disposed on the sensing electrodes, the driving electrodes, the first bridge electrodes, and the second bridge electrodes, defining a plurality of light blocking openings overlapping the first sub-light emitting regions when viewed in a plan view, and overlapping the first pixel units when viewed in a plan view.

According to an embodiment, an area of each of the dummy openings may be less than or equal to an area of each of the first sub-light emitting regions when viewed in a plan view.

According to an embodiment, at least one insulating layer configured to electrically insulate the first bridge pattern from the second bridge pattern may be disposed between the first bridge pattern and the second bridge pattern.

According to an embodiment, the first bridge pattern may include: a plurality of first bridge units, each including a dummy pattern defining the dummy openings; and a plurality of unit connection wires electrically connecting the first bridge units to each other.

According to an embodiment, the dummy pattern may include: a first dummy pattern defining a plurality of first dummy openings; a second dummy pattern defining a plurality of second dummy openings; a third dummy pattern defining a plurality of third dummy openings; a first dummy connection part electrically connecting the first dummy pattern to the second dummy pattern; and a second dummy connection part electrically connecting the second dummy pattern to the third dummy pattern.

According to an embodiment, the first bridge units may be spaced apart from the second pixel unit when viewed in a plan view.

According to an embodiment, the display device may further include a dummy bridge pattern disposed on a same layer as the second bridge pattern and completely overlapping a portion of the first bridge pattern when viewed in a plan view.

According to an embodiment, at least a portion of the dummy bridge pattern may be disposed between two dummy openings that are adjacent to each other among the dummy openings when viewed in a plan view.

According to an embodiment, the dummy bridge pattern may be electrically insulated from the second bridge pattern.

An embodiment of a display device includes: a pixel layer including a plurality of first pixel units, each including a plurality of first sub-light emitting regions, and a plurality of second pixel units, each including a plurality of second sub-light emitting regions; a plurality of sensing electrodes disposed on the pixel layer; a plurality of driving electrodes disposed on the pixel layer and electrically insulated from the sensing electrodes; a plurality of first bridge electrodes disposed on the pixel layer, electrically connecting the sensing electrodes to each other, and each including a second bridge pattern spaced apart from the first sub-light emitting regions and the second sub-light emitting regions when viewed in a plan view; a plurality of second bridge electrodes disposed on the pixel layer, electrically connecting the driving electrodes to each other, and each including a first bridge pattern defining a plurality of dummy openings overlapping the first sub-light emitting regions when viewed in a plan view; and a light blocking pattern disposed on the sensing electrodes, the driving electrodes, the first bridge electrodes, and the second bridge electrodes, defining a plurality of light blocking openings overlapping the first sub-light emitting regions when viewed in a plan view, and overlapping the first pixel units when viewed in a plan view.

The display device according to an embodiment of the present disclosure may include: a plurality of sensing electrodes, each including a dummy pattern defining a plurality of dummy openings; and a light blocking pattern defining a plurality of light blocking openings. Accordingly, a light emitted from a first sub-light emitting region can pass through the dummy openings and the light blocking openings, and can have a relatively narrow viewing angle.

The display device according to another embodiment of the present disclosure may include: a plurality of first bridge electrodes electrically connecting a plurality of sensing electrodes to each other, and each including a first bridge pattern defining a plurality of dummy openings; and a light blocking pattern defining a plurality of light blocking openings. Accordingly, a light emitted from a first sub-light emitting region can pass through the dummy openings and the light blocking openings, and can have a relatively narrow viewing angle.

The display device according to still another embodiment of the present disclosure may include: a plurality of second bridge electrodes electrically connecting a plurality of driving electrodes to each other, and each including a first bridge pattern defining a plurality of dummy openings; and a light blocking pattern defining a plurality of light blocking openings. Accordingly, a light emitted from a first sub-light emitting region can pass through the dummy openings and the light blocking openings, and can have a relatively narrow viewing angle.

BRIEF DESCRIPTION OF THE DRAWINGS

FIGS. 2, 3, 4, 5, 6, 7, 8, 9, 10, and 11 illustrate a portion of a display device according to an embodiment of the present disclosure.

FIGS. 12, 13, 14, 15, 16, 17, and 18 illustrate another portion of the display device according to an embodiment of the present disclosure.

FIGS. 19, 20, 21, 22, and 23 illustrate a portion of a display device according to another embodiment of the present disclosure.

FIGS. 24, 25, 26, 27, and 28 illustrate another portion of the display device according to another embodiment of the present disclosure.

DETAILED DESCRIPTION OF THE EMBODIMENTS

Figure 1:
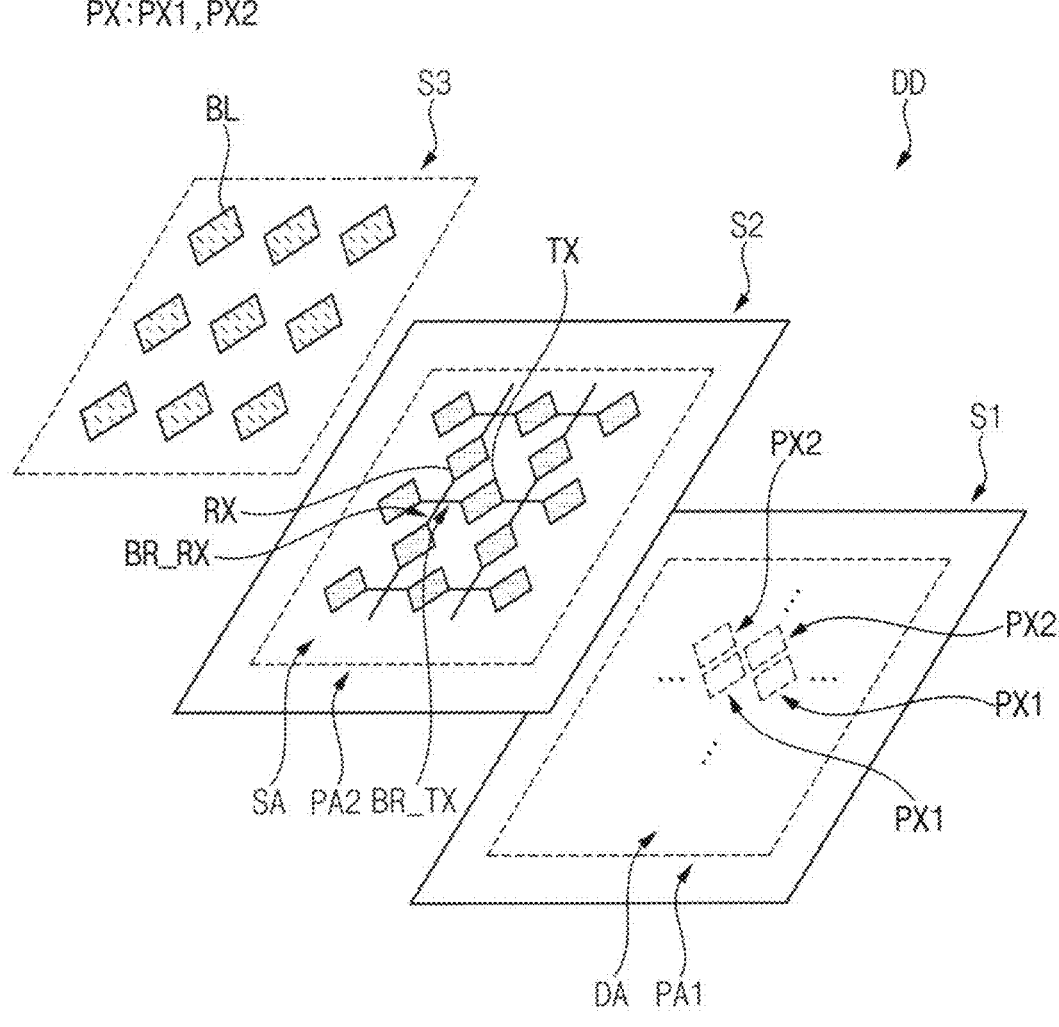
FIG. 1 illustrates a display device according to embodiments of the present disclosure.

Hereinafter, a display device according to embodiments of the present disclosure will be described in more detail with reference to the accompanying drawings. The same or similar reference numerals will be used for the same components in the accompanying drawings.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

FIG. 1 is a view for describing a display device according to embodiments of the present disclosure.

Referring to FIG. 1, a display device DD may include a pixel layer S1, a touch sensing layer S2, and a light blocking layer S3.

The pixel layer S1 may include a display region DA and a first peripheral region PA1.

A plurality of pixel units PX may be disposed in the display region DA. Each of the pixel units PX may include a plurality of sub-pixels, and each of the sub-pixels may emit a light. The display device DD may display an image by combining the lights emitted from the sub-pixels.

The pixel units PX may include a plurality of first pixel units PX1 and a plurality of second pixel units PX2. Each of the first pixel units PX1 may include a plurality of first sub-pixels, and each of the second pixel units PX2 may include a plurality of second sub-pixels. A viewing angle of a light emitted from each of the first sub-pixels may be substantially the same as a viewing angle of a light emitted from each of the second sub-pixels. However, the light emitted from each of the first sub-pixels may pass through the touch sensing layer S2 and the light blocking layer S3, which will be described below, and may have a relatively narrow viewing angle. Accordingly, when lights are emitted only from the first sub-pixels without being emitted from the second sub-pixels (e.g., when the display device DD is driven in a privacy protection mode), the display device DD may display an image having a relatively narrow viewing angle. This will be described in detail below with reference to FIGS. 2 to 28.

The first peripheral region PA1 may surround the display region DA. A driver configured to drive the sub-pixels may be disposed in the first peripheral region PA1.

The touch sensing layer S2 may be disposed on the pixel layer S1. The touch sensing layer S2 may include a sensing region SA and a second peripheral region PA2.

At least an electrode configured to detect a touch input may be disposed in the sensing region SA. For example, a plurality of sensing electrodes RX and a plurality of driving electrodes TX electrically insulated from the sensing electrodes RX may be disposed in the sensing region SA. In this case, a capacitance may be generated between the sensing electrodes RX and the driving electrodes TX, and the touch input may be detected by measuring a variation of the capacitance that is changed by a touch of a user of the display device DD.

The sensing electrodes RX may be electrically connected to each other by a plurality of first bridge electrodes BR_RX, and the driving electrodes TX may be electrically connected to each other by a plurality of second bridge electrodes BR_TX. In this case, the first bridge electrodes BR_RX may be electrically insulated from the driving electrodes TX and the second bridge electrodes BR_TX, and the second bridge electrodes BR_TX may be electrically insulated from the sensing electrodes RX. According to an embodiment, as shown in FIG. 1, the sensing electrodes RX and the first bridge electrodes BR_RX may define a plurality of sensing columns, and the driving electrodes TX and the second bridge electrodes BR_TX may define a plurality of driving rows.

The sensing region SA may overlap the display region DA, so that the display device DD may detect the touch input of the user in a region where the image is displayed.

The second peripheral region PA2 may surround the sensing region SA. A plurality of wirings electrically connected to the sensing columns and the driving rows may be disposed in the second peripheral region PA2.

The light blocking layer S3 may be disposed on the touch sensing layer S2. The light blocking layer S3 may overlap the sensing region SA and the display region DA. The light blocking layer S3 may include a light blocking pattern BL, and the light blocking pattern BL will be described in detail below with reference to FIGS. 2 to 28.

Hereinafter, a portion of a display device according to an embodiment of the present disclosure will be described with reference to FIGS. 2 to 11.

Figure 2:
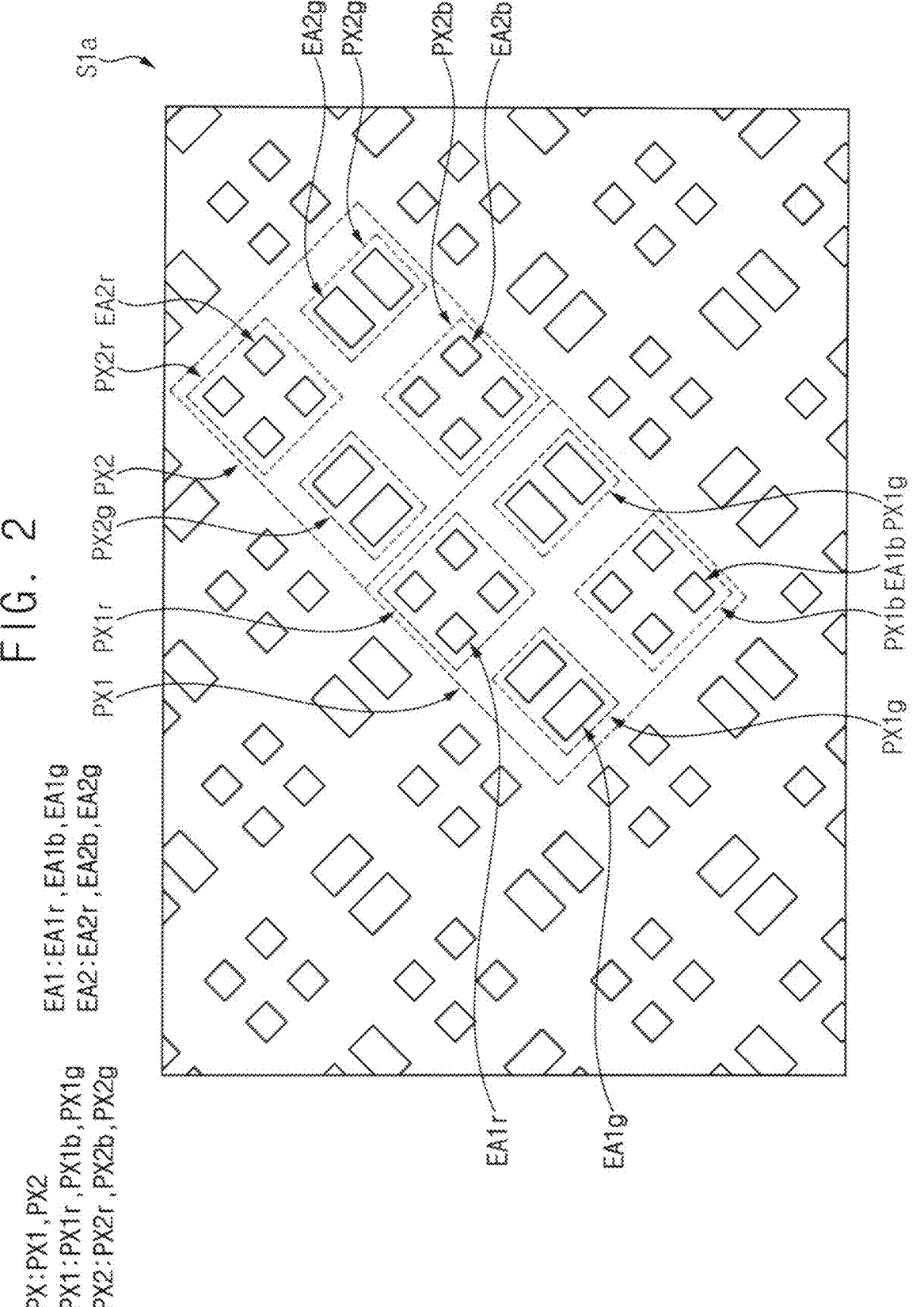

FIG. 2 is an enlarged plan view showing a partial region S1a of the pixel layer S1 of FIG. 1. A partial region S1a of the pixel layer S1 may be a region overlapping a portion of an electrode among the sensing electrodes RX and the driving electrodes TX.

Referring to FIG. 2, the first pixel units PX1 and the second pixel units PX2 may be disposed in the partial region S1a of the pixel layer S1. The first pixel units PX1 and the second pixel units PX2 may be alternately arranged in one direction while being alternately arranged in another direction that is perpendicular to the one direction.

Each of the first pixel units PX1 may include a plurality of first sub-pixels PX1r, PX1b, and PX1g, and each of the second pixel units PX2 may include a plurality of second sub-pixels PX2r, PX2b, and PX2g. When viewed in a plan view, a region in which a light is substantially emitted from each of the first sub-pixels PX1r, PX1b, and PX1g may be defined as a first sub-light emitting region EA1, and a region in which a light is substantially emitted from each of the second sub-pixels PX2r, PX2b, and PX2g may be defined as a second sub-light emitting region EA2.

For example, each of the first pixel units PX1 may include a plurality of first red sub-pixels PX1r, a plurality of first green sub-pixels PX1g, and a plurality of first blue sub-pixels PX1b, regions in which lights are substantially emitted from the first red sub-pixels PX1r may be defined as a plurality of first red light emitting regions EA1r, regions in which lights are substantially emitted from the first green sub-pixels PX1g may be defined as a plurality of first green light emitting regions EA1g, and regions in which lights are substantially emitted from the first blue sub-pixels PX1b may be defined as a plurality of first blue light emitting regions EA1b.

In addition, each of the second pixel units PX2 may include a plurality of second red sub-pixels PX2r, a plurality of second green sub-pixels PX2g, and a plurality of second blue sub-pixels PX2b, regions in which lights are substantially emitted from the second red sub-pixels PX2r may be defined as a plurality of second red light emitting regions EA2r, regions in which lights are substantially emitted from the second green sub-pixels PX2g may be defined as a plurality of second green light emitting regions EA2g, and regions in which lights are substantially emitted from the second blue sub-pixels PX2b may be defined as a plurality of second blue light emitting regions EA2b.

Figure 3:
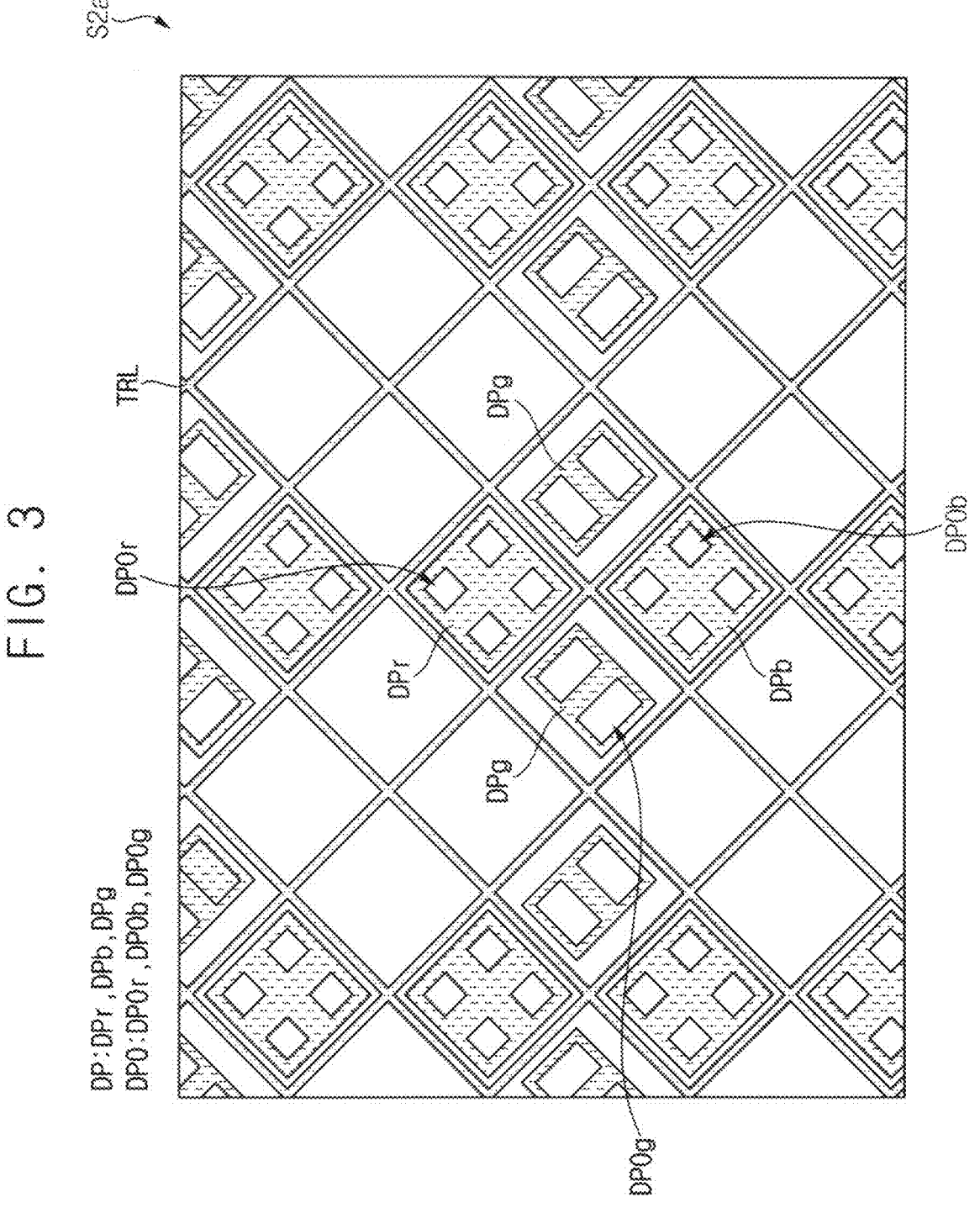
Figure 4:
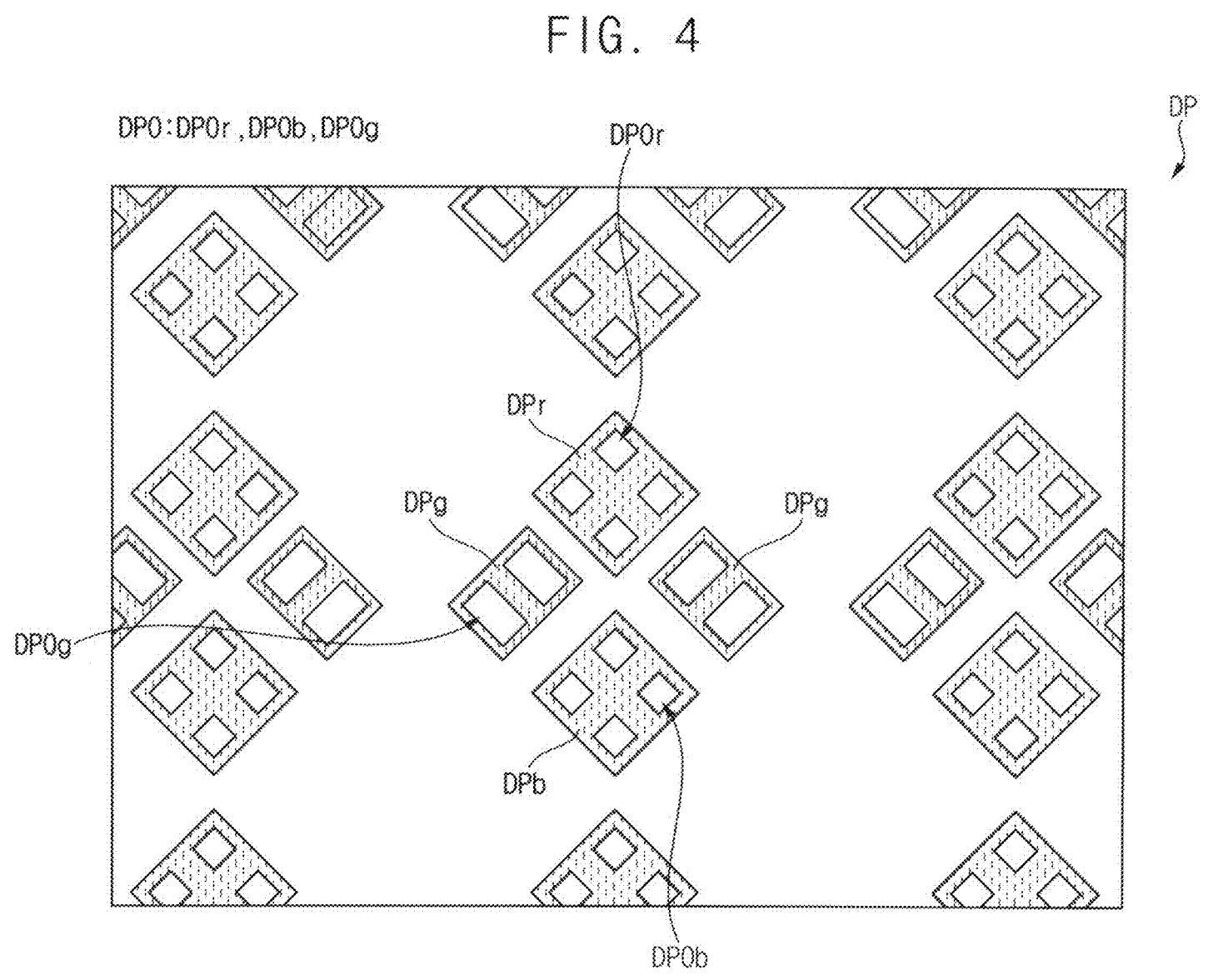

FIG. 3 is an enlarged plan view showing a partial region S2a of the touch sensing layer S2 of FIG. 1. FIG. 4 is a plan view for describing a dummy pattern DP disposed in the partial region S2a of the touch sensing layer S2, and FIG. 5 is a plan view for describing a sensing pattern TRL disposed in the partial region S2a of the touch sensing layer S2. A partial region S2a of the touch sensing layer S2 may be a region overlapping the partial region S1a of the pixel layer S1, in which the portion of one electrode among the sensing electrodes RX and the driving electrodes TX of FIG. 1 is shown.

Referring to FIGS. 2 to 5, a dummy pattern DP and a sensing pattern TRL may be disposed in the partial region S2a of the touch sensing layer S2. Each of the sensing electrodes RX and the driving electrodes TX may include a dummy pattern DP and a sensing pattern TRL.

The dummy pattern DP may overlap the first pixel units PX1 when viewed in a plan view, and may be spaced apart from the second pixel units PX2 when viewed in a plan view. The dummy pattern DP may define a plurality of dummy openings DPO. The dummy openings DPO may overlap the first sub-light emitting regions EA1 when viewed in a plan view.

The dummy pattern DP may adjust viewing angles of lights emitted from the first sub-light emitting regions EA1. In detail, a portion of the lights emitted from the first sub-light emitting regions EA1 may be blocked by the dummy pattern DP, and another portion of the lights emitted from the first sub-light emitting regions EA1 may pass through the dummy openings DPO. The lights that have passed through the dummy openings DPO may have relatively narrow viewing angles. Accordingly, the lights emitted from the first sub-light emitting regions EA1 may pass through the dummy openings DPO, and may have the relatively narrow viewing angles.

Lights emitted from the second sub-light emitting regions EA2 may not be substantially blocked by the dummy pattern DP. Accordingly, the lights emitted from the second sub-light emitting regions EA2 may have relatively wide viewing angles.

According to an embodiment, the dummy pattern DP may include: a first dummy pattern DPr defining a plurality of first dummy openings DPOr; a second dummy pattern DPg defining a plurality of second dummy openings DPOg; and a third dummy pattern DPb defining a plurality of third dummy openings DPOb. In this case, the first dummy openings DPOr may overlap the first red light emitting regions EA1r when viewed in a plan view, the second dummy openings DPOg may overlap the first green light emitting regions EA1g when viewed in a plan view, and the third dummy openings DPOb may overlap the first blue light emitting regions EA1b when viewed in a plan view.

As shown in FIG. 3, the first dummy pattern DPr, the second dummy pattern DPg, and the third dummy pattern DPb may be spaced apart from each other when viewed in a plan view. In this case, each of the first dummy pattern DPr, the second dummy pattern DPg, and the third dummy pattern DPb may be surrounded by the sensing pattern TRL when viewed in a plan view.

The sensing pattern TRL may be a pattern configured to detect the touch input. For example, a driving signal may be provided to the sensing pattern TRL included in each of the driving electrodes TX, and a sensing signal may be provided to the sensing pattern TRL included in each of the sensing electrode RX.

The sensing pattern TRL may be electrically insulated from the dummy pattern DP. For example, at least one insulating layer (e.g., YIL2 of FIG. 8) configured to electrically insulate the dummy pattern DP from the sensing pattern TRL may be disposed between the dummy pattern DP and the sensing pattern TRL. Accordingly, the driving signal and the sensing signal may not be provided to the dummy pattern DP.

The sensing pattern TRL may be spaced apart from the first sub-light emitting regions EA1 and the second sub-light emitting regions EA2 when viewed in a plan view. According to an embodiment, the sensing pattern TRL may be sufficiently spaced apart from the first sub-light emitting regions EA1 and the second sub-light emitting regions EA2 when viewed in a plan view to not block light emitted by the first sub-light emitting regions EA1 and the second sub-light emitting regions EA2. Accordingly, the sensing pattern TRL may not substantially block the lights emitted from the first sub-light emitting regions EA1 and the lights emitted from the second sub-light emitting regions EA2.

As shown in FIG. 5, the sensing pattern TRL may have a mesh shape when viewed in a plan view. In addition, as shown in FIG. 3, the sensing pattern TRL may be spaced apart from the dummy pattern DP when viewed in a plan view.

Figure 6:
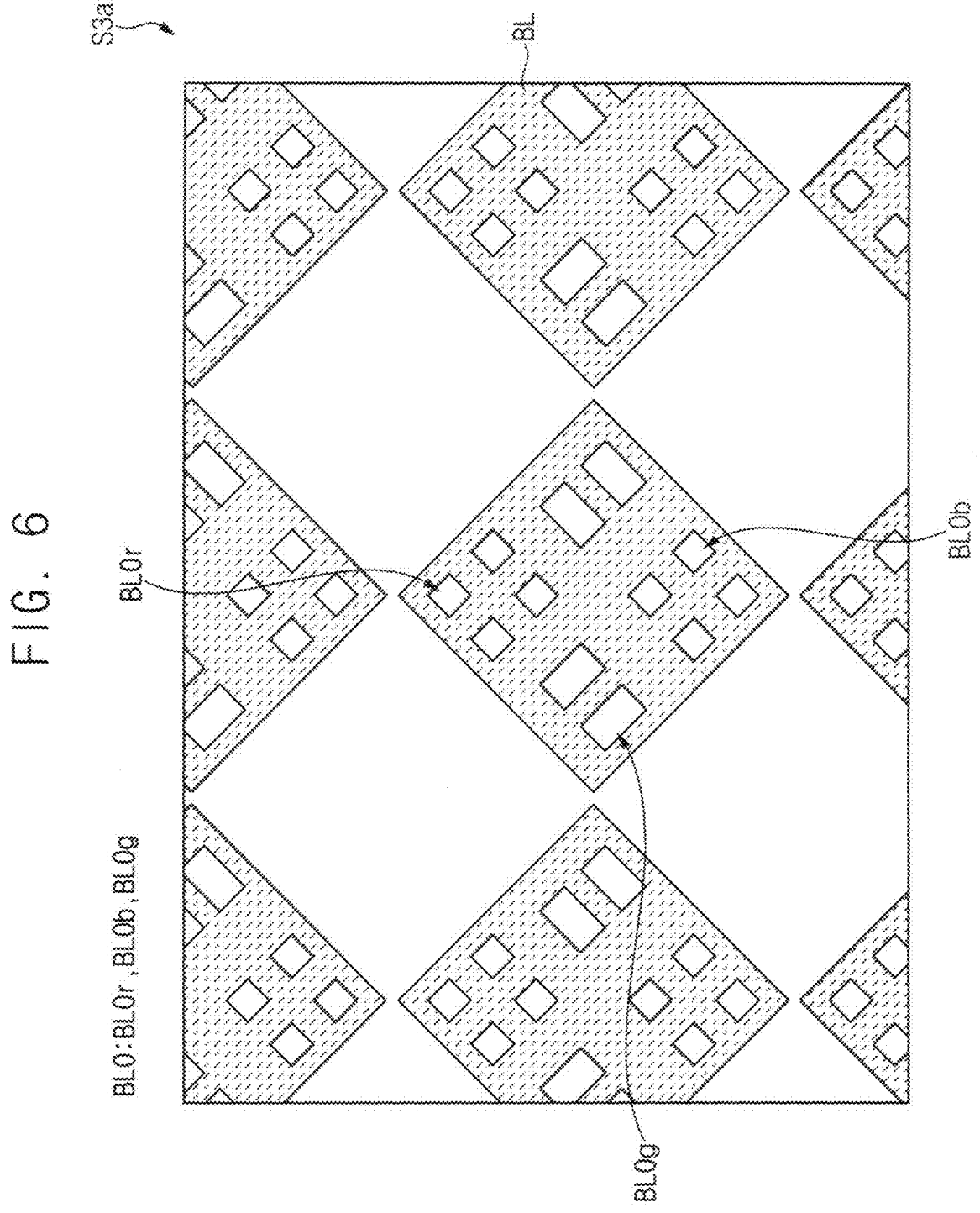

FIG. 6 is an enlarged plan view showing a partial region S3a of the light blocking layer S3 of FIG. 1. A partial region S3a of the light blocking layer S3 may be a region overlapping the partial region S2a of the touch sensing layer S2 and the partial region S1a of the pixel layer S1.

Referring to FIGS. 2 and 6, the light blocking pattern BL may be disposed in the partial region S3a of the light blocking layer S3.

The light blocking pattern BL may overlap the first pixel units PX1 when viewed in a plan view. In addition, the light blocking pattern BL may define a plurality of light blocking openings BLO. The light blocking openings BLO may overlap the first sub-light emitting regions EA1 when viewed in a plan view.

The light blocking pattern BL may adjust the viewing angles of the lights emitted from the first sub-light emitting regions EA1. In detail, a portion of the lights emitted from the first sub-light emitting regions EA1 to pass through the dummy openings DPO may be blocked by the light blocking pattern BL, and another portion of the lights emitted from the first sub-light emitting regions EA1 to pass through the dummy openings DPO may pass through the light blocking openings BLO. Accordingly, the lights emitted from the first sub-light emitting regions EA1 may pass through the dummy openings DPO and the light blocking openings BLO, and may have relatively narrow viewing angles.

The light blocking pattern BL may be spaced apart from the second pixel units PX2 when viewed in a plan view. In this case, the lights emitted from the second sub-light emitting regions EA2 may not be substantially blocked by the light blocking pattern BL. Accordingly, the lights emitted from the second sub-light emitting regions EA2 may have relatively wide viewing angles.

According to an embodiment, the light blocking openings BLO may include a plurality of first light blocking openings BLOr, a plurality of second light blocking openings BLOg, and a plurality of third light blocking openings BLOb. In this case, the first light blocking openings BLOr may overlap the first red light emitting regions EA1r when viewed in a plan view, the second light blocking openings BLOg may overlap the first green light emitting regions EA1g when viewed in a plan view, and the third light blocking openings BLOb may overlap the first blue light emitting regions EA1b when viewed in a plan view.

Figure 7:
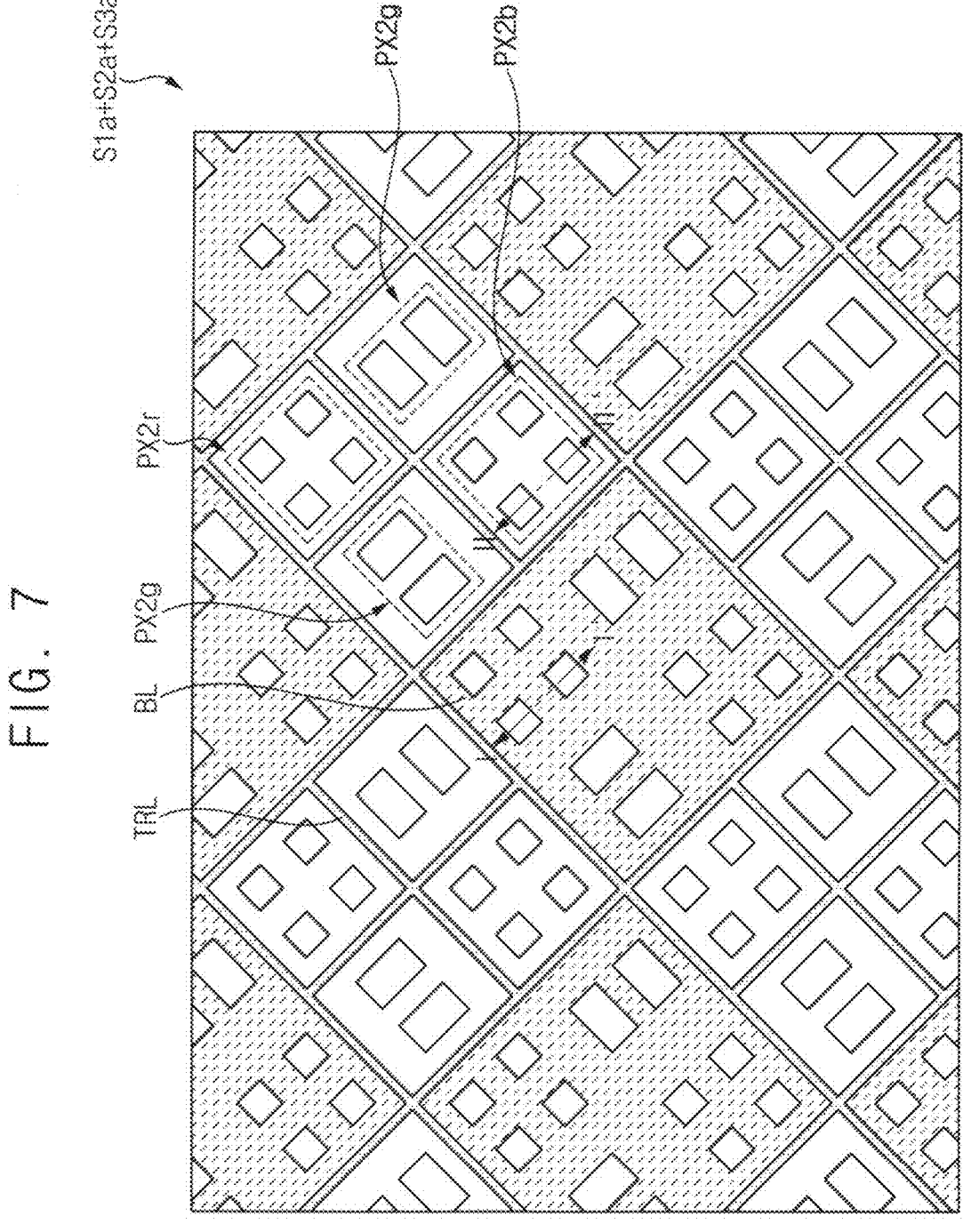
Figure 8:
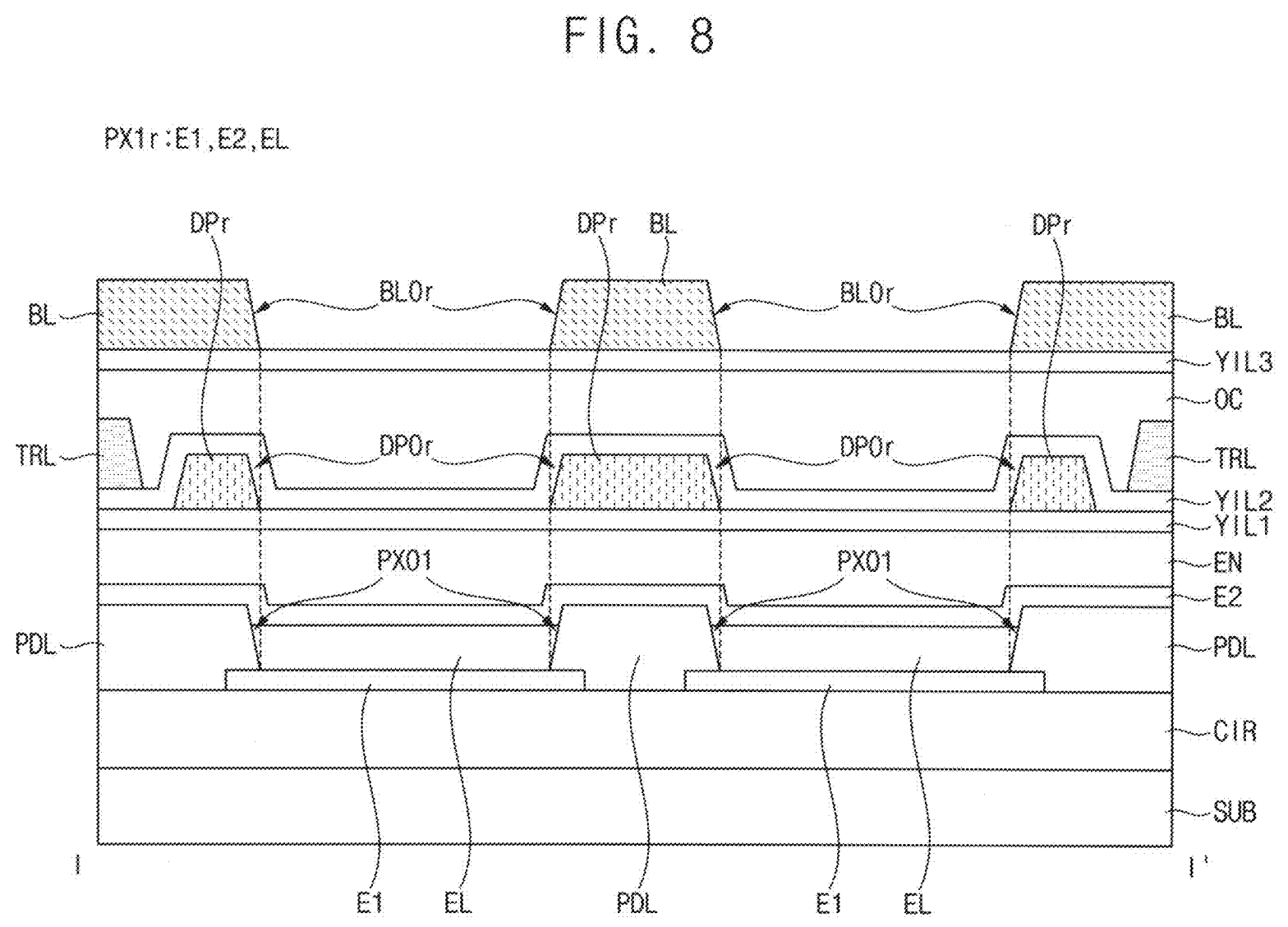

FIG. 7 is a plan view showing the configurations shown in FIGS. 2, 3, and 6 to overlap each other, and FIG. 8 is a cross-sectional view taken along a line I-I' of FIG. 7. FIG. 8 is a cross-sectional view showing two first red light emitting regions that are adjacent to each other among a plurality of first red light emitting regions EA1r.

Referring to FIGS. 7 and 8, the display device DD may include a substrate SUB, a circuit layer CIR, a first electrode E1, a pixel defining layer PDL, a light emitting material EL, a second electrode E2, an encapsulation layer EN, a first insulating layer YIL1, a first dummy pattern DPr, a second insulating layer YIL2, a sensing pattern TRL, a coating layer OC, a third insulating layer YIL3, and a light blocking pattern BL.

The substrate SUB may include glass, plastic, and the like. According to an embodiment, the substrate SUB may include a material having flexibility, so that the substrate SUB may have a flexible property.

The circuit layer CIR may be disposed on the substrate SUB. The circuit layer CIR may include a plurality of insulating layers and a plurality of transistors. For example, the circuit layer CIR may include a first driving transistor and a second driving transistor.

The first electrode E1 may be disposed on the circuit layer CIR. The first electrode E1 may be electrically connected to the transistors. The first electrode E1 may be referred to as an anode electrode.

The pixel defining layer PDL may be disposed on the circuit layer CIR. The pixel defining layer PDL may define a plurality of pixel openings PXO1 exposing at least a portion of the first electrode E1.

The light emitting material EL may be disposed on the first electrode E1 within the pixel opening PXO1. According to an embodiment, the light emitting material EL may include an organic light emitting material.

The second electrode E2 may cover the light emitting material EL and the pixel defining layer PDL. The second electrode E2 may be referred to as a cathode electrode.

The first electrode E1, the light emitting material EL, and the second electrode E2 may overlap each other, and may define the first red sub-pixels PX1r. In this case, the first red light emitting regions EA1r may be defined as regions in which the pixel openings PXO1 are formed.

The encapsulation layer EN may be disposed on the second electrode E2. The encapsulation layer EN may cover the second electrode E2. According to an embodiment, the encapsulation layer EN may include: a first inorganic encapsulation layer disposed on the second electrode E2; an organic encapsulation layer disposed on the first inorganic encapsulation layer; and a second inorganic encapsulation layer disposed on the organic encapsulation layer.

The first insulating layer YIL1 may be disposed on the encapsulation layer EN. The first insulating layer YIL1 may include an inorganic insulating material or an organic insulating material.

The first dummy pattern DPr may be disposed on the first insulating layer YIL1. The first dummy pattern DPr may define the first dummy openings DPOr.

The second insulating layer YIL2 may be disposed on the first insulating layer YIL1. The second insulating layer YIL2 may cover the first dummy pattern DPr. The second insulating layer YIL2 may include an inorganic insulating material or an organic insulating material.

The sensing pattern TRL may be disposed on the second insulating layer YIL2. In addition, the coating layer OC covering the sensing pattern TRL may be disposed on the second insulating layer YIL2. According to an embodiment, the coating layer OC may include a color filter layer. The color filter layer may selectively transmit a light having a specific wavelength.

The third insulating layer YIL3 may be disposed on the coating layer OC. The third insulating layer YIL3 may include an inorganic insulating material or an organic insulating material.

The light blocking pattern BL may be disposed on the third insulating layer YIL3. The light blocking pattern BL may define the first light blocking openings BLOr.

According to an embodiment, an area of each of the light blocking openings BLO may be substantially equal to an area of each of the first sub-light emitting regions EA1 when viewed in a plan view. In other words, the light blocking openings BLO may substantially completely overlap the first sub-light emitting regions EA1 when viewed in a plan view, respectively.

For example, referring to FIGS. 2, 6, 7, and 8, the first light blocking openings BLOr may substantially completely overlap the first red light emitting regions EA1r, which are defined as the regions in which the pixel openings PXO1 are formed, respectively. Similarly, the second light blocking openings BLOg may substantially completely overlap the first green light emitting regions EA1g when viewed in a plan view, respectively, and the third light blocking openings BLOb may substantially completely overlap the first blue light emitting regions EA1b when viewed in a plan view, respectively.

However, since the above configuration has been provided for illustrative purposes, the area of each of the light blocking openings BLO may be greater than the area of each of the first sub-light emitting regions EA1 when viewed in a plan view. This will be described in detail below with reference to FIG. 10.

According to an embodiment, an area of each of the dummy openings DPO may be substantially equal to the area of each of the first sub-light emitting regions EA1 when viewed in a plan view. In other words, the dummy openings DPO may substantially completely overlap the first sub-light emitting regions EA1 when viewed in a plan view, respectively.

For example, as shown in FIG. 8, the first dummy openings DPOr may substantially completely overlap the first red light emitting regions EA1r, which are defined as the regions in which the pixel openings PXO1 are formed, respectively. Similarly, the second dummy openings DPOg may substantially completely overlap the first green light emitting regions EA1g when viewed in a plan view, respectively, and the third dummy openings DPOb may substantially completely overlap the first blue light emitting regions EA1b when viewed in a plan view, respectively.

However, since the above configuration has been provided for illustrative purposes, the area of each of the dummy openings DPO may be less than the area of each of the first sub-light emitting regions EA1 when viewed in a plan view. This will be described in detail below with reference to FIG. 10.

Figure 9:
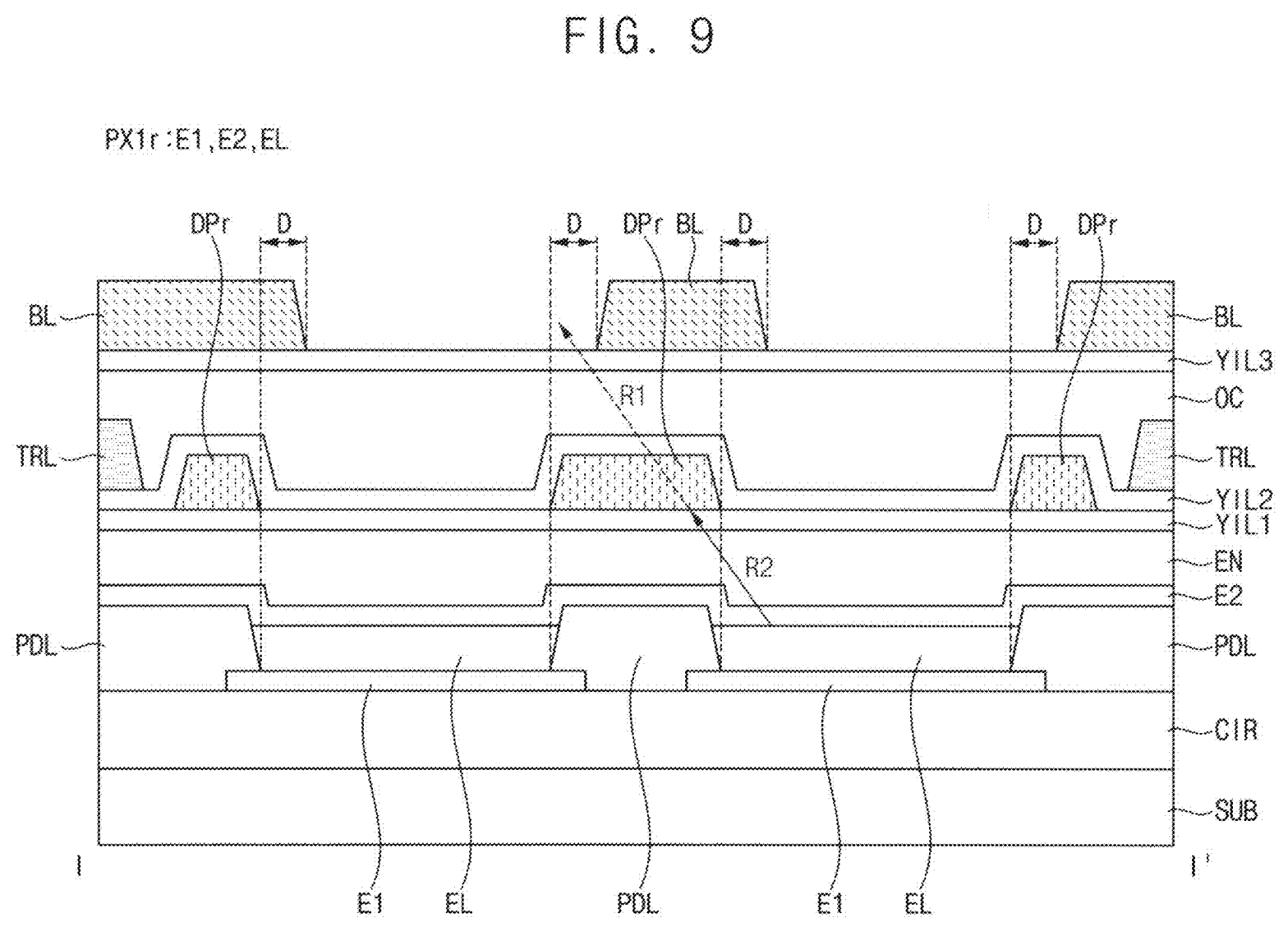

FIG. 9 is a cross-sectional view for describing misalignment of a light blocking pattern BL. FIG. 9 may be substantially the same as FIG. 8 except for a position of the light blocking pattern BL. Therefore, redundant descriptions thereof will be omitted.

Referring to FIG. 9, the light blocking pattern BL may be misaligned due to an error and the like in a formation process, so that a misalignment region D may be defined.

In this case, when the first dummy pattern DPr does not exist, a light emitted from the light emitting material EL may travel through a first route R1. The light traveling through the first route R1 may pass through the misalignment region D so as to be recognized by the user of the display device DD, and may have a relatively wide viewing angle. Accordingly, even when the display device DD is driven in the privacy protection mode, the image displayed on the display device DD may have a relatively wide viewing angle.

According to the present disclosure, the first dummy pattern DPr may block the light traveling through the first route R1. For example, the light emitted from the light emitting material EL may travel through a second route R2 so as to be blocked by the first dummy pattern DPr. Accordingly, even when the light blocking pattern BL is misaligned, the image displayed on the display device DD driven in the privacy protection mode may have a relatively narrow viewing angle.

FIG. 10 is a cross-sectional view taken along a line I-I' of FIG. 7. FIG. 10 may be substantially the same as FIG. 8 except for sizes of a plurality of first dummy openings DPOr' and sizes of a plurality of first light blocking openings BLOr'. Therefore, redundant descriptions thereof will be omitted.

Referring to FIGS. 7 and 10, the first dummy pattern DPr may define a plurality of first dummy openings DPOr', and the light blocking pattern BL may define a plurality of first light blocking openings BLOr'.

According to an embodiment, the area of each of the light blocking openings BLO may be greater than the area of each of the first sub-light emitting regions EA1 when viewed in a plan view. In other words, the light blocking openings BLO may substantially completely cover the first sub-light emitting regions EA1 when viewed in a plan view, respectively.

For example, as shown in FIG. 10, a size of each of the first light blocking openings BLOr' may be greater than a size of each of the first red light emitting regions EA1r, which are defined as the regions in which the pixel openings PXO1 are formed, when viewed in a cross-sectional view.

According to an embodiment, the area of each of the dummy openings DPO may be less than the area of each of the first sub-light emitting regions EA1 when viewed in a plan view. In other words, the first sub-light emitting regions EA1 may substantially completely cover the dummy openings DPO when viewed in a plan view, respectively.

For example, as shown in FIG. 10, a size of each of the first dummy openings DPOr may be less than a size of each of the first red light emitting regions EA1r, which are defined as the regions in which the pixel openings PXO1 are formed, when viewed in a cross-sectional view.

Figure 11:
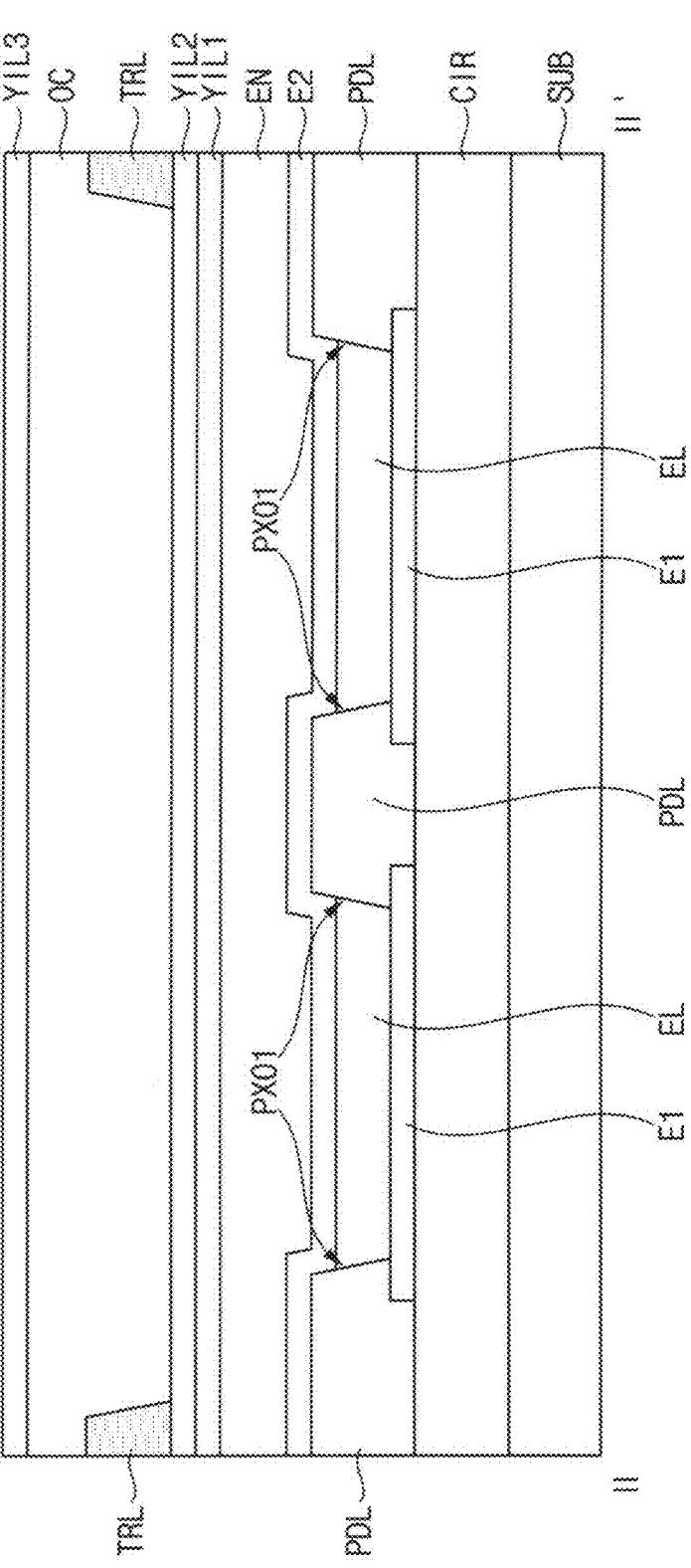

FIG. 11 is a cross-sectional view taken along a line II-II' of FIG. 7. FIG. 11 is a cross-sectional view showing two second red light emitting regions that are adjacent to each other among a plurality of second red light emitting regions EA2r. FIG. 11 may be substantially the same as FIG. 8 except for the first dummy pattern DPr and the light blocking pattern BL. Therefore, redundant descriptions thereof will be omitted.

Referring to FIGS. 7 and 11, the display device DD may include a substrate SUB, a circuit layer CIR, a first electrode E1, a pixel defining layer PDL, a light emitting material EL, a second electrode E2, an encapsulation layer EN, a first insulating layer YIL1, a second insulating layer YIL2, a sensing pattern TRL, a coating layer OC, and a third insulating layer YIL3.

The first electrode E1, the light emitting material EL, and the second electrode E2 may overlap each other, and may define the second red sub-pixels PX2r. In this case, the second red light emitting regions EA2r may be defined as regions in which the pixel openings PXO1 are formed.

The first dummy pattern DPr and the light blocking pattern BL may not be disposed on the second red sub-pixels PX2r. Accordingly, lights emitted from the second red sub-pixels PX2r may not be substantially blocked by the first dummy pattern DPr and the light blocking pattern BL.

Hereinafter, another portion of the display device according to an embodiment of the present disclosure will be described with reference to FIGS. 12 to 18.

Figure 12:
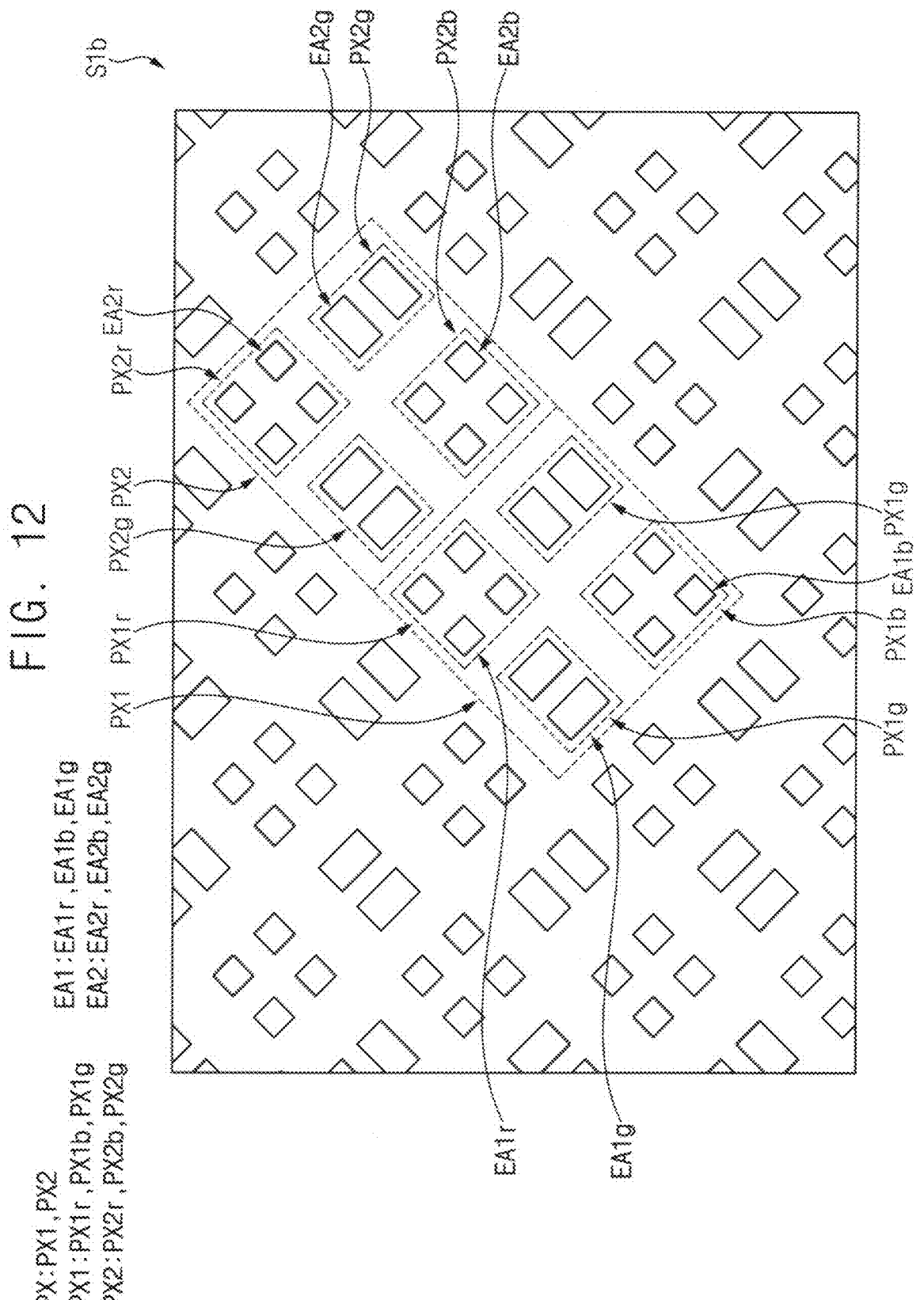

FIG. 12 is an enlarged plan view showing a partial region S1b of the pixel layer S1 of FIG. 1. A partial region S1b of the pixel layer S1 may be a region in which a portion of a region where the first bridge electrodes BR_RX and the second bridge electrodes BR_TX overlap each other is shown.

Referring to FIG. 12, the first pixel units PX1 and the second pixel units PX2 may be disposed in the partial region S1b of the pixel layer S1. The first pixel units PX1 and the second pixel units PX2 disposed in the partial region S1b of the pixel layer S1 may be substantially the same as the first pixel units PX1 and the second pixel units PX2 disposed in the partial region S1a of the pixel layer S1, which have been described with reference to FIG. 2. Therefore, redundant descriptions thereof will be omitted.

Figure 13:
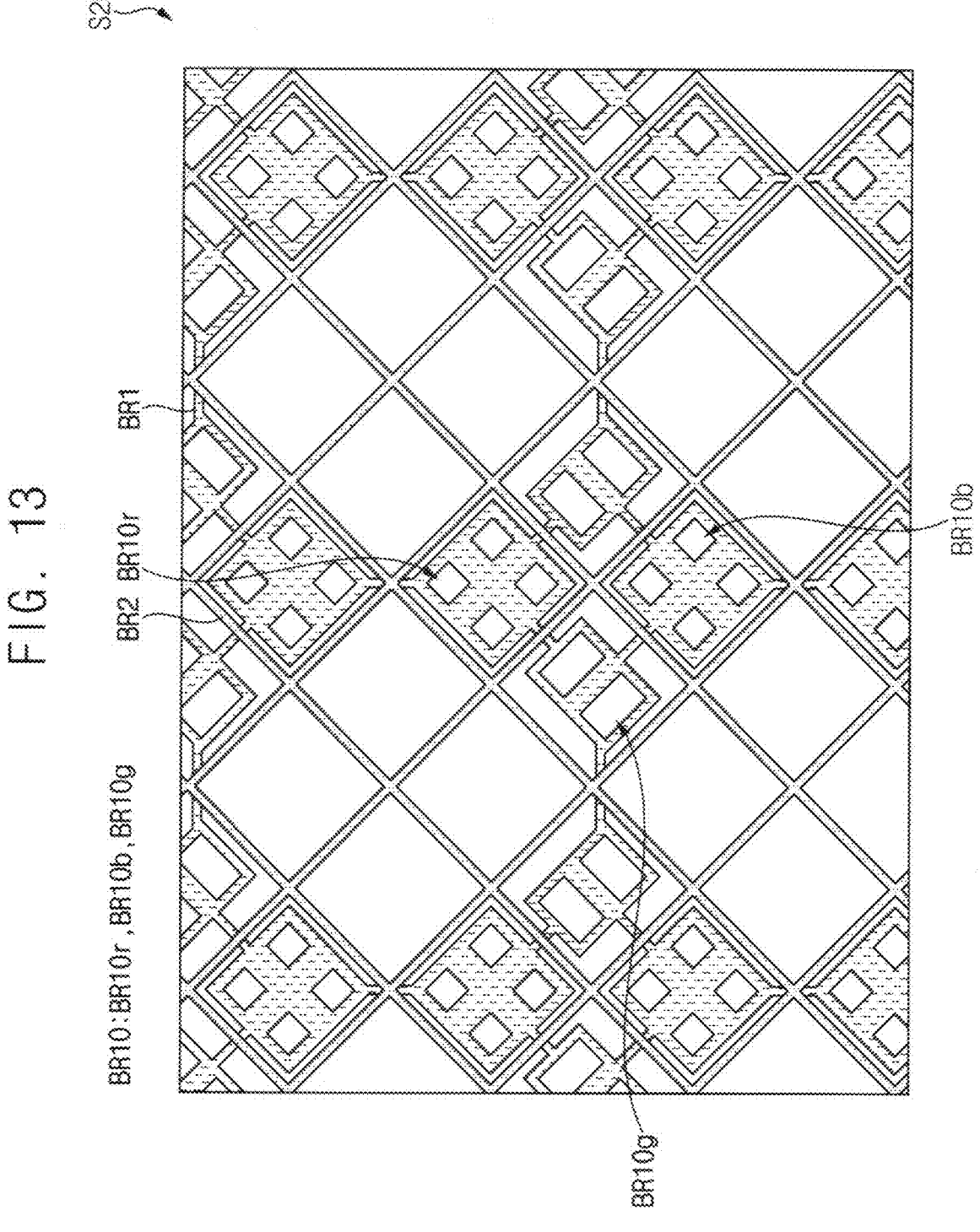
Figure 15:
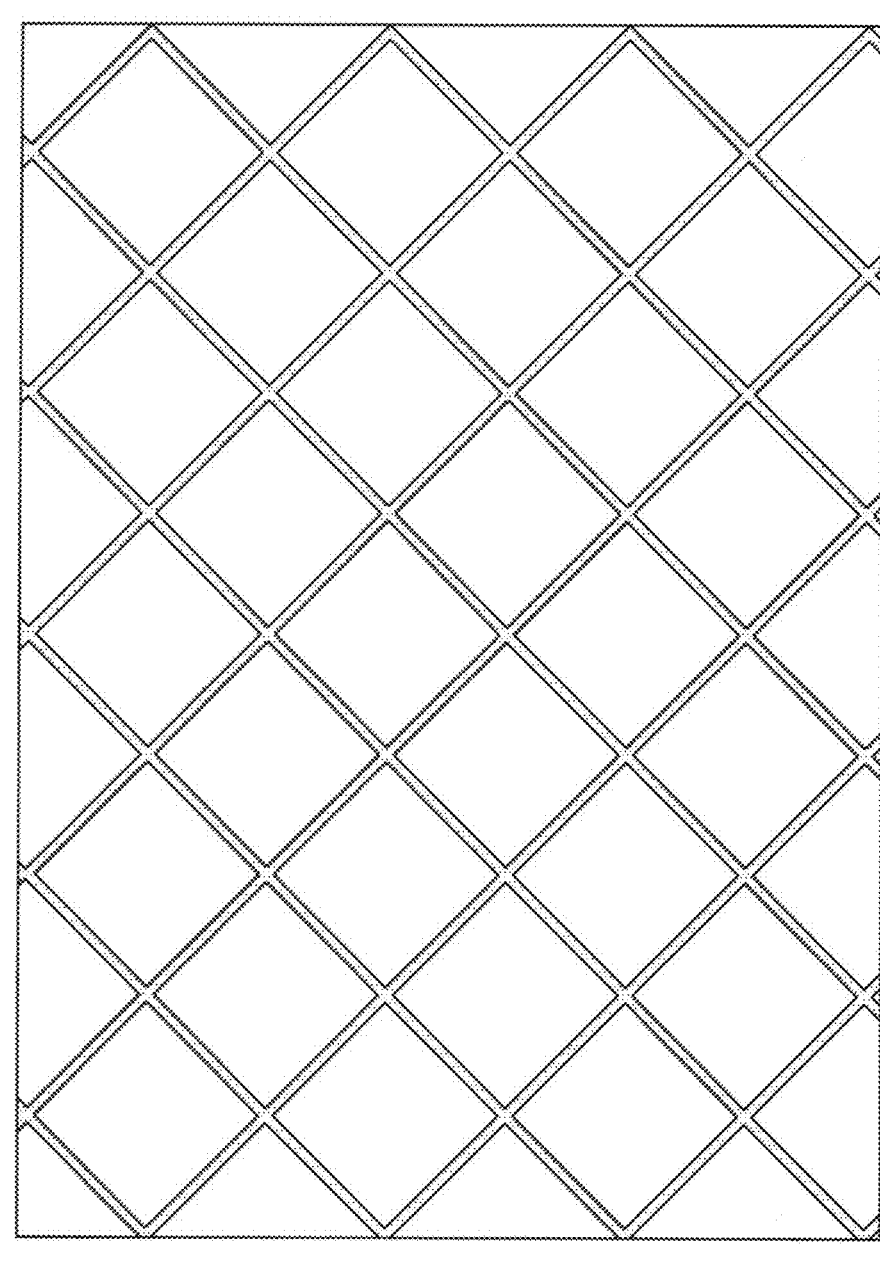

FIG. 13 is an enlarged plan view showing a partial region S2b of the touch sensing layer S2 of FIG. 1. FIG. 14 is a plan view for describing a first bridge pattern BR1 disposed in the partial region S2b of the touch sensing layer S2, and FIG. 15 is a plan view for describing a second bridge pattern BR2 disposed in the partial region S2b of the touch sensing layer S2. A partial region S2b of the touch sensing layer S2 may be a region overlapping the partial region S1b of the pixel layer S1, in which the portion of the region where the first bridge electrodes BR_RX and the second bridge electrodes BR_TX of FIG. 1 overlap each other is shown.

Referring to FIGS. 12 to 15, a first bridge pattern BR1 and a second bridge pattern BR2 may be disposed in the partial region S2b of the touch sensing layer S2.

According to an embodiment, each of the first bridge electrodes BR_RX may include a first bridge pattern BR1, and each of the second bridge electrodes BR_TX may include a second bridge pattern BR2. In this case, the sensing signal may be provided to the first bridge pattern BR1, and the driving signal may be provided to the second bridge pattern BR2.

According to another embodiment, each of the first bridge electrodes BR_RX may include a second bridge pattern BR2, and each of the second bridge electrodes BR_TX may include a first bridge pattern BR1. In this case, the driving signal may be provided to the first bridge pattern BR1, and the sensing signal may be provided to the second bridge pattern BR2.

The first bridge pattern BR1 may define a plurality of dummy openings BR1O. The dummy openings BR1O may overlap the first sub-light emitting regions EA1 when viewed in a plan view.

The first bridge pattern BR1 may adjust the viewing angles of the lights emitted from the first sub-light emitting regions EA1. In detail, a portion of the lights emitted from the first sub-light emitting regions EA1 may be blocked by the first bridge pattern BR1, and another portion of the lights emitted from the first sub-light emitting regions EA1 may pass through the dummy openings BR1O. The lights that have passed through the dummy openings BR1O may have relatively narrow viewing angles. Accordingly, the lights emitted from the first sub-light emitting regions EA1 may pass through the dummy openings BR1O, and may have the relatively narrow viewing angles.

The first bridge pattern BR1 may be sufficiently spaced apart from the second sub-light emitting regions EA2 when viewed in a plan view. Accordingly, the first bridge pattern BR1 may not substantially block the lights emitted from the second sub-light emitting regions EA2.

According to an embodiment, the first bridge pattern BR1 may include a plurality of first bridge units BR1U and a plurality of unit connection wires BR13.

The first bridge units BR1U may define the dummy openings BR1O. For example, each of the first bridge units BR1U may include: a first dummy pattern BR1r defining a plurality of first dummy openings BR1Or; a second dummy pattern BR1g defining a plurality of second dummy openings BR1Og; a third dummy pattern BR1b defining a plurality of third dummy openings BR1Ob; a first dummy connection part BR11 electrically connecting the first dummy pattern BR1r to the second dummy pattern BR1g; and a second dummy connection part BR12 electrically connecting the second dummy pattern BR1g to the third dummy pattern BR1b. In this case, the first dummy openings BR1Or may overlap the first red light emitting regions EA1r when viewed in a plan view, the second dummy openings BR1Og may overlap the first green light emitting regions EA1g when viewed in a plan view, and the third dummy openings BR1Ob may overlap the first blue light emitting regions EA1b when viewed in a plan view.

The first bridge units BR1U may overlap the first pixel units PX1 when viewed in a plan view. In this case, a portion of the lights emitted from the first sub-light emitting regions EA1 may be blocked by the first bridge units BR1U, and another portion of the lights emitted from the first sub-light emitting regions EA1 may pass through the dummy openings BR1O. The lights that have passed through the dummy openings BR1O may have relatively narrow viewing angles. Accordingly, the lights emitted from the first sub-light emitting regions EA1 may pass through the dummy openings BR1O, and may have the relatively narrow viewing angles.

In addition, the first bridge units BR1U may be spaced apart from the second pixel units PX2 when viewed in a plan view. In this case, the lights emitted from the second sub-light emitting regions EA2 may not be substantially blocked by the first bridge units BR1U. Accordingly, the lights emitted from the second sub-light emitting regions EA2 may have relatively wide viewing angles.

The unit connection wires BR13 may electrically connect the first bridge units BR1U to each other. According to an embodiment, a portion of the unit connection wires BR13 may overlap the second pixel units PX2 when viewed in a plan view. In this case, the unit connection wires BR13 may be sufficiently spaced apart from the second sub-light emitting regions EA2 when viewed in a plan view. Accordingly, the unit connection wires BR13 may not substantially block the lights emitted from the second sub-light emitting regions EA2.

The second bridge pattern BR2 may be electrically insulated from the first bridge pattern BR1. For example, at least one insulating layer (e.g., YIL2 of FIG. 18) configured to electrically insulate the second bridge pattern BR2 from the first bridge pattern BR1 may be disposed between the second bridge pattern BR2 and the first bridge pattern BR1.

The second bridge pattern BR2 may be spaced apart from the first sub-light emitting regions EA1 and the second sub-light emitting regions EA2 when viewed in a plan view. According to an embodiment, the second bridge pattern BR2 may be sufficiently spaced apart from the first sub-light emitting regions EA1 and the second sub-light emitting regions EA2 when viewed in a plan view. Accordingly, the second bridge pattern BR2 may not substantially block the lights emitted from the first sub-light emitting regions EA1 and the lights emitted from the second sub-light emitting regions EA2.

As shown in FIG. 15, the second bridge pattern BR2 may have a mesh shape when viewed in a plan view. In addition, as shown in FIGS. 13 and 14, the second bridge pattern BR2 may be spaced apart from the first dummy pattern BR1r, the second dummy pattern BR1g, and the third dummy pattern BR1b when viewed in a plan view.

Figure 16:
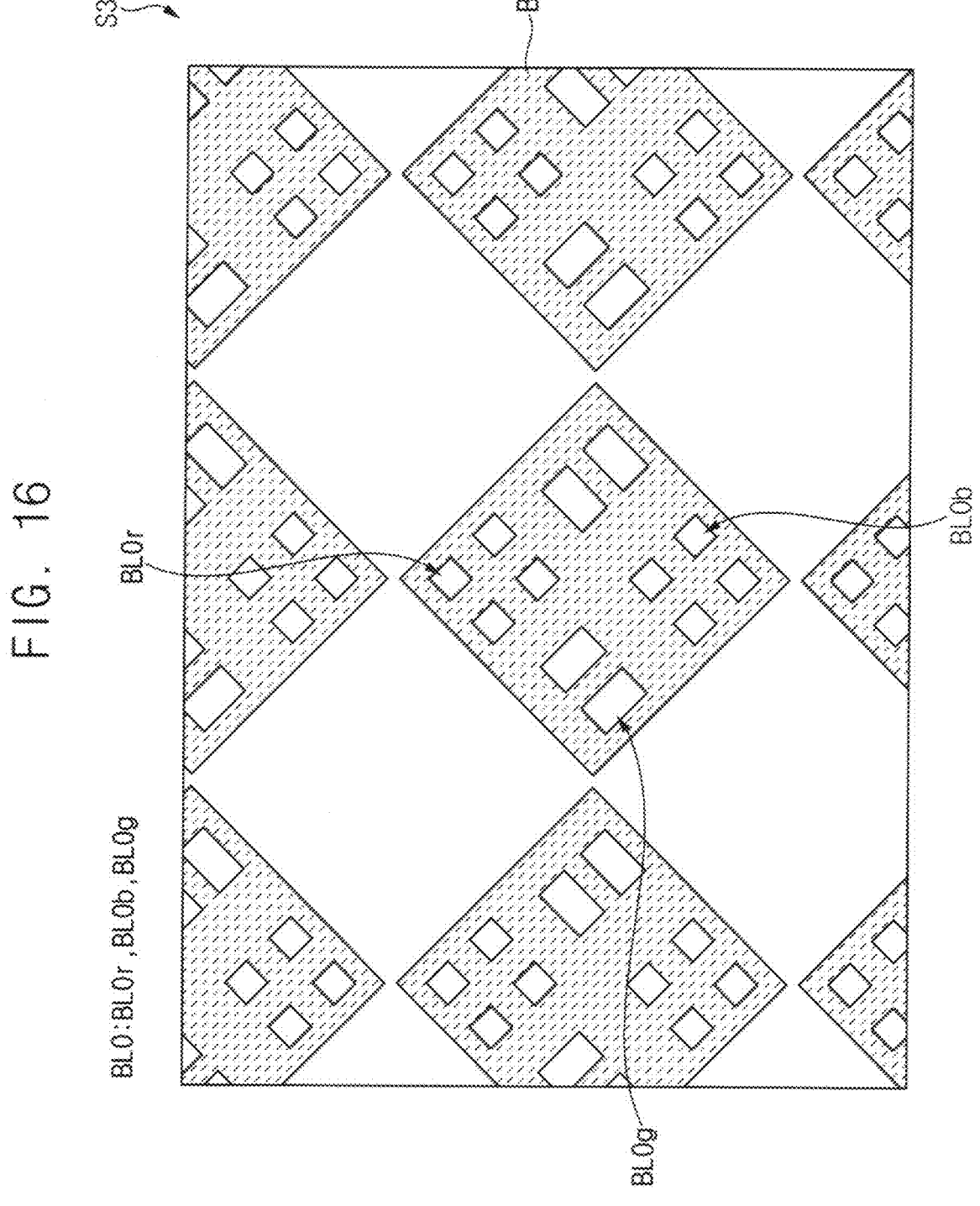

FIG. 16 is an enlarged plan view showing a partial region S3b of the light blocking layer S3 of FIG. 1. A partial region S3b of the light blocking layer S3 may be a region overlapping the partial region S2b of the touch sensing layer S2 and the partial region S1a of the pixel layer S1.

Referring to FIGS. 12 and 16, the light blocking pattern BL may be disposed in the partial region S3b of the light blocking layer S3. The light blocking pattern BL disposed in the partial region S3b of the light blocking layer S3 may be substantially the same as the light blocking pattern BL disposed in the partial region S3a of the light blocking layer S3, which has been described with reference to FIG. 6. Therefore, redundant descriptions thereof will be omitted.

The light blocking pattern BL may adjust the viewing angles of the lights emitted from the first sub-light emitting regions EA1. In detail, a portion of the lights emitted from the first sub-light emitting regions EA1 to pass through the dummy openings BR1O may be blocked by the light blocking pattern BL, and another portion of the lights emitted from the first sub-light emitting regions EA1 to pass through the dummy openings BR1O may pass through the light blocking openings BLO. Accordingly, the lights emitted from the first sub-light emitting regions EA1 may pass through the dummy openings BR1O and the light blocking openings BLO, and may have relatively narrow viewing angles.

The light blocking pattern BL may be spaced apart from the second pixel units PX2 when viewed in a plan view. In this case, the lights emitted from the second sub-light emitting regions EA2 may not be substantially blocked by the light blocking pattern BL. Accordingly, the lights emitted from the second sub-light emitting regions EA2 may have relatively wide viewing angles.

Figure 17:
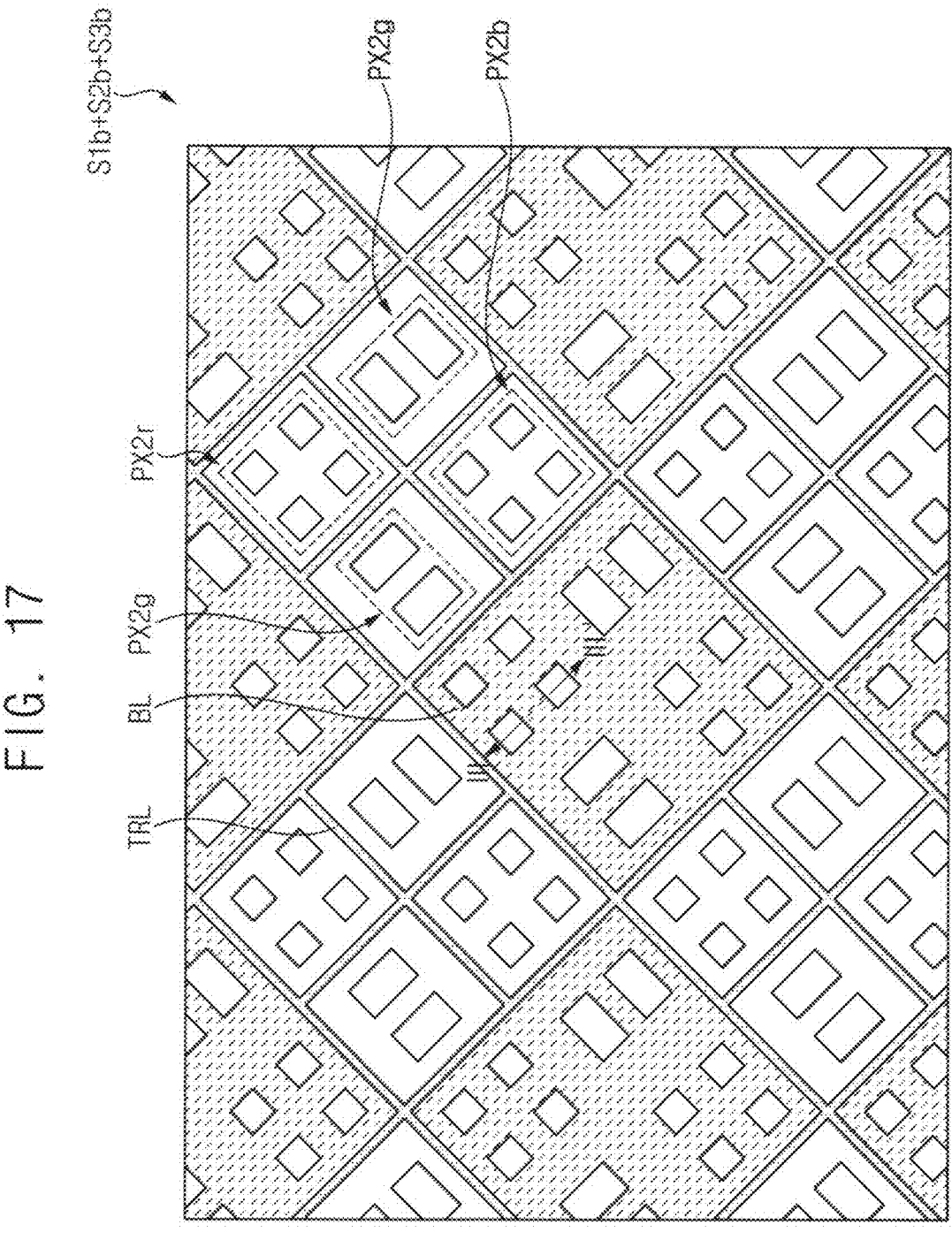
Figure 18:
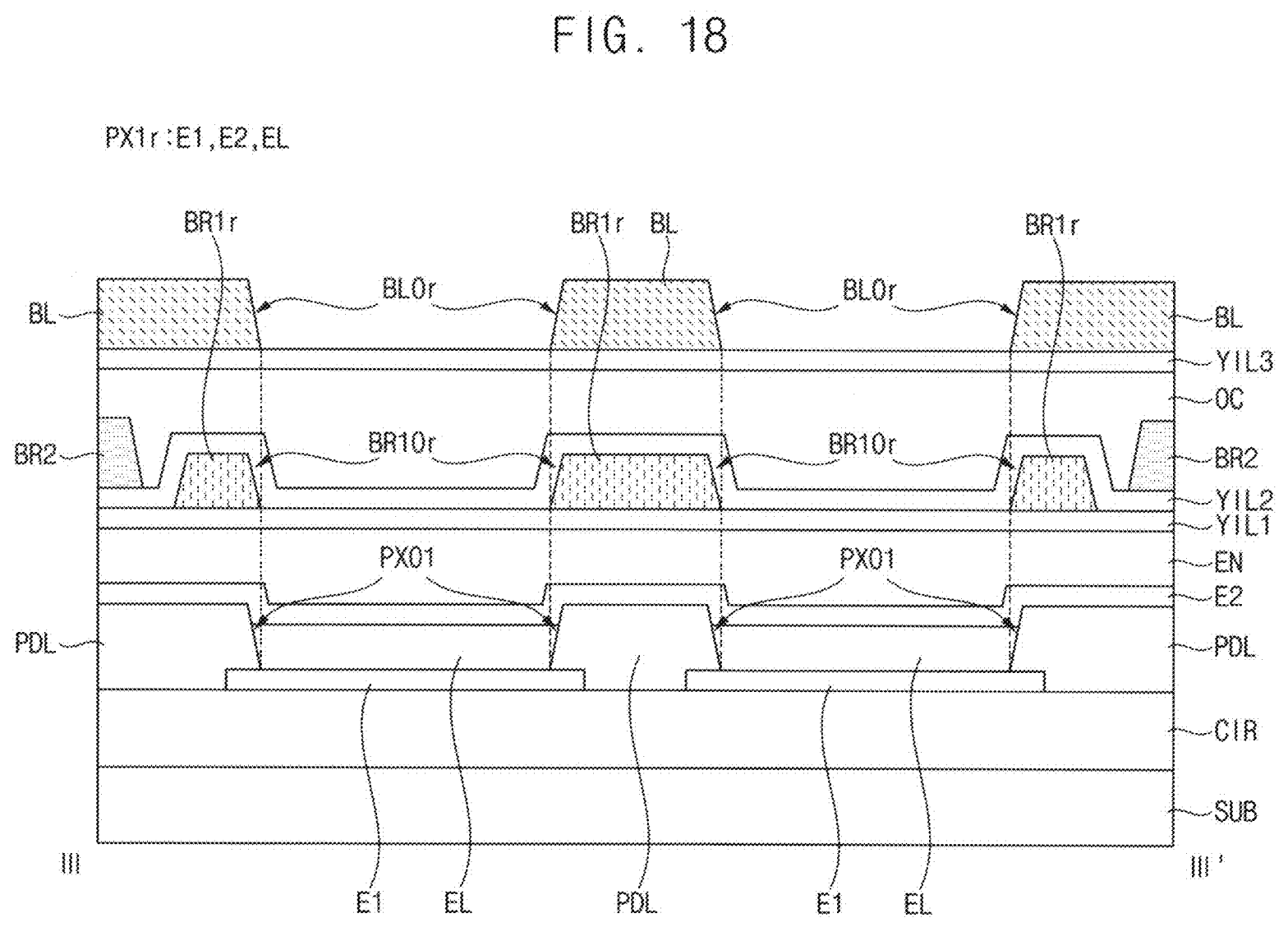

FIG. 17 is a plan view showing the configurations shown in FIGS. 12, 13, and 16 to overlap each other, and FIG. 18 is a cross-sectional view taken along a line III-III' of FIG. 17. FIG. 18 is a cross-sectional view showing two first red light emitting regions that are adjacent to each other among a plurality of first red light emitting regions EA1r.

Referring to FIGS. 17 and 18, the display device DD may include a substrate SUB, a circuit layer CIR, a first electrode E1, a pixel defining layer PDL, a light emitting material EL, a second electrode E2, an encapsulation layer EN, a first insulating layer YIL1, a first dummy pattern BR1r, a second insulating layer YIL2, a second bridge pattern BR2, a coating layer OC, a third insulating layer YIL3, and a light blocking pattern BL.

The substrate SUB, the circuit layer CIR, the first electrode E1, the pixel defining layer PDL, the light emitting material EL, the second electrode E2, the encapsulation layer EN, the first insulating layer YIL1, the second insulating layer YIL2, the coating layer OC, the third insulating layer YIL3, and the light blocking pattern BL may be substantially the same as the substrate SUB, the circuit layer CIR, the first electrode E1, the pixel defining layer PDL, the light emitting material EL, the second electrode E2, the encapsulation layer EN, the first insulating layer YIL1, the second insulating layer YIL2, the coating layer OC, the third insulating layer YIL3, and the light blocking pattern BL, which have been described with reference to FIGS. 7 and 8. Therefore, redundant descriptions thereof will be omitted.

The first electrode E1, the light emitting material EL, and the second electrode E2 may overlap each other, and may define the first red sub-pixels PX1r. In this case, the first red light emitting regions EA1r may be defined as regions in which the pixel openings PXO1 are formed.

The first dummy pattern BR1r may be disposed on the first insulating layer YIL1. The first dummy pattern BR1r may define a plurality of first dummy openings BR1Or.

The second insulating layer YIL2 may be disposed on the first insulating layer YIL1. The second insulating layer YIL2 may cover the first dummy pattern BR1r.

The second bridge pattern BR2 may be disposed on the second insulating layer YIL2. In addition, the coating layer OC covering the second bridge pattern BR2 may be disposed on the second insulating layer YIL2.

The light blocking pattern BL may be disposed on the third insulating layer YIL3. The light blocking pattern BL may define a plurality of first light blocking openings BLOr.

According to an embodiment, an area of each of the light blocking openings BLO may be substantially equal to an area of each of the first sub-light emitting regions EA1 when viewed in a plan view. In other words, the light blocking openings BLO may substantially completely overlap the first sub-light emitting regions EA1 when viewed in a plan view, respectively.

However, since the above configuration has been provided for illustrative purposes, the area of each of the light blocking openings BLO may be greater than the area of each of the first sub-light emitting regions EA1 when viewed in a plan view.

According to an embodiment, an area of each of the dummy openings BR1O may be substantially equal to the area of each of the first sub-light emitting regions EA1 when viewed in a plan view. In other words, the dummy openings BR1O may substantially completely overlap the first sub-light emitting regions EA1 when viewed in a plan view, respectively.

For example, as shown in FIG. 18, the first dummy openings BR1Or may substantially completely overlap the first red light emitting regions EA1$r$, which are defined as the regions in which the pixel openings PXO1 are formed, respectively. Similarly, the second dummy openings BR1Og may substantially completely overlap the first green light emitting regions EA1$g$ when viewed in a plan view, respectively, and the third dummy openings BR1Ob may substantially completely overlap the first blue light emitting regions EA1$b$ when viewed in a plan view, respectively.

However, since the above configuration has been provided for illustrative purposes, the area of each of the dummy openings BR1O may be less than the area of each of the first sub-light emitting regions EA1 when viewed in a plan view.

Hereinafter, a portion of a display device according to another embodiment of the present disclosure will be described with reference to FIGS. 19 to 23.

Figure 19:
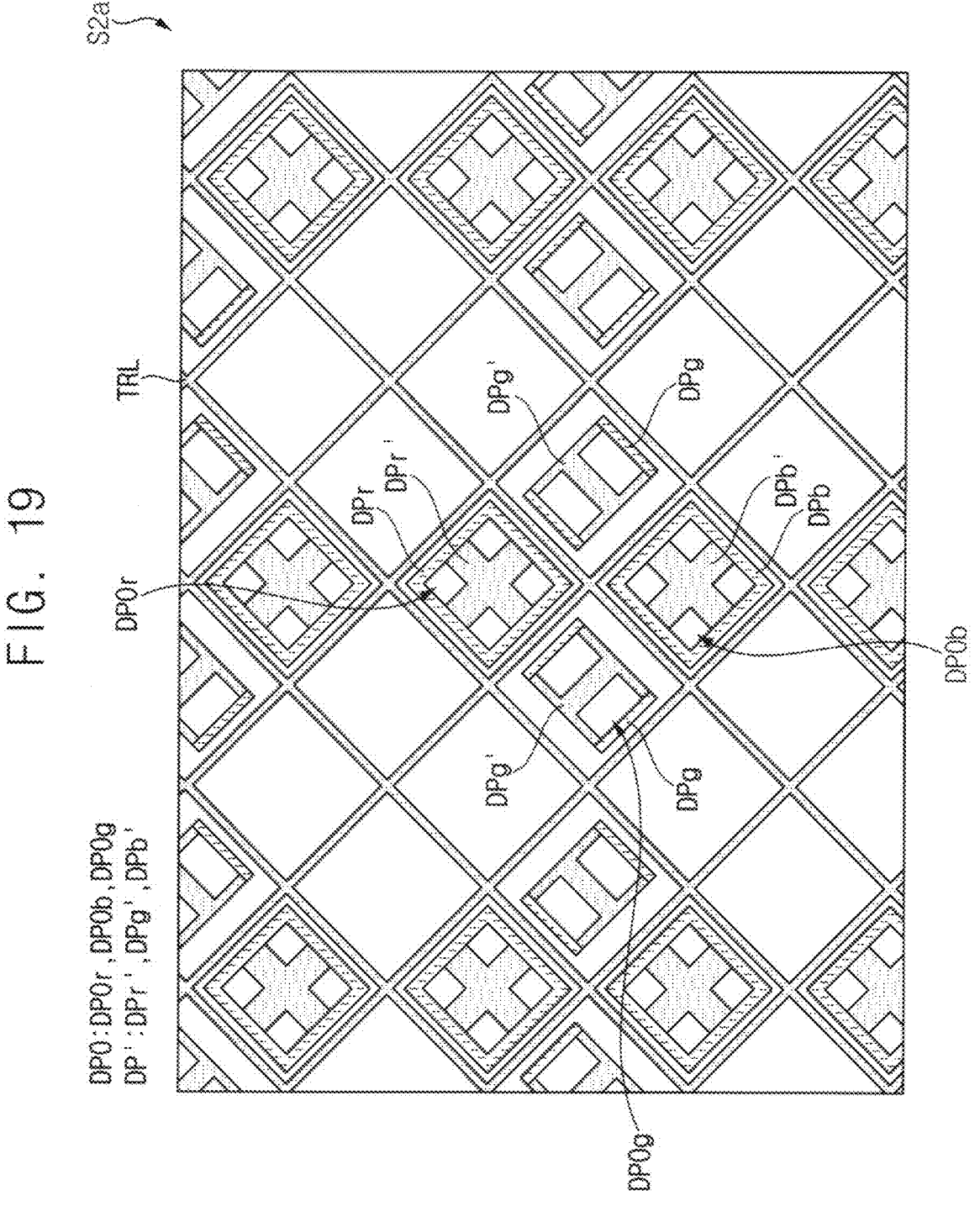
Figure 20:
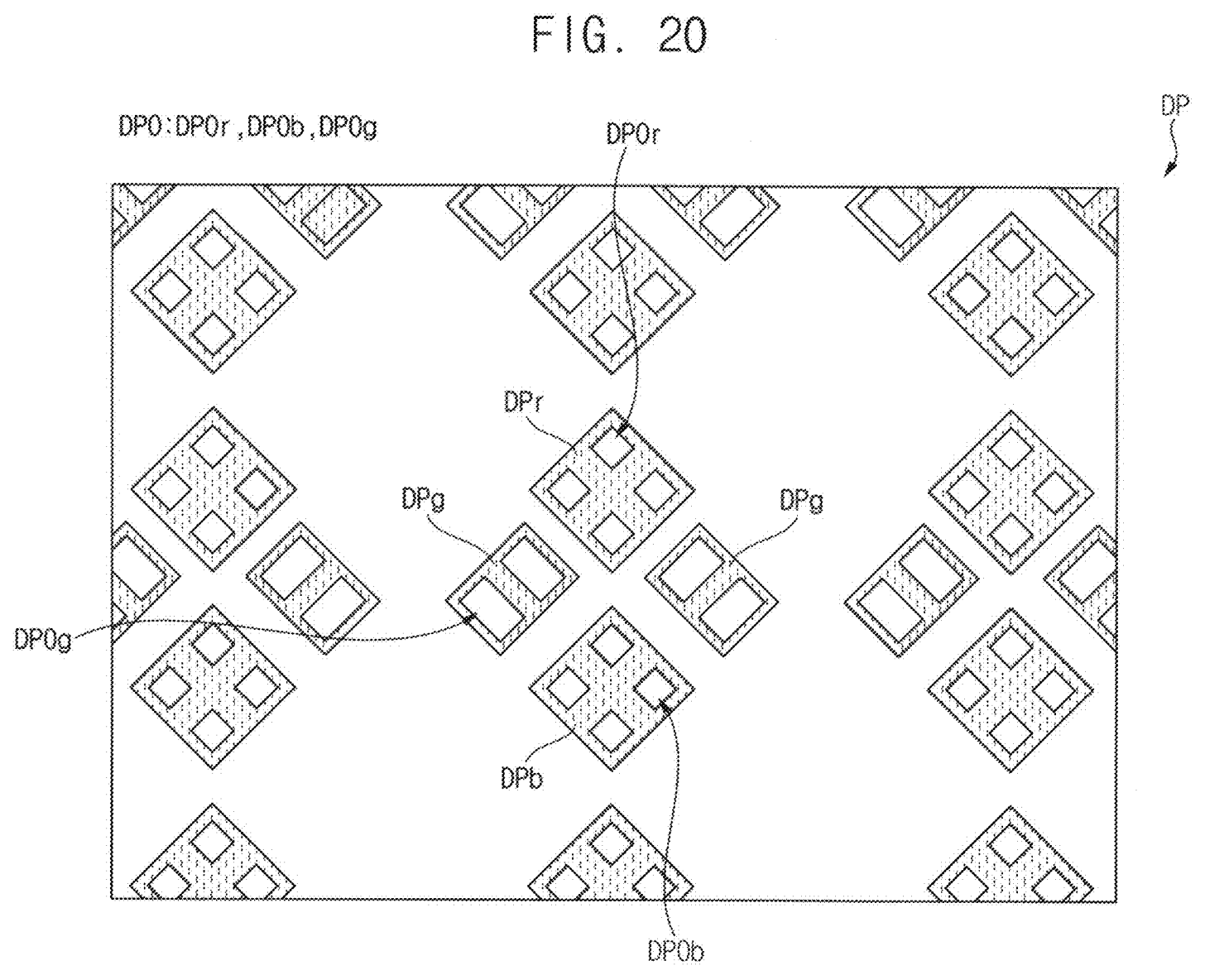
Figure 21:
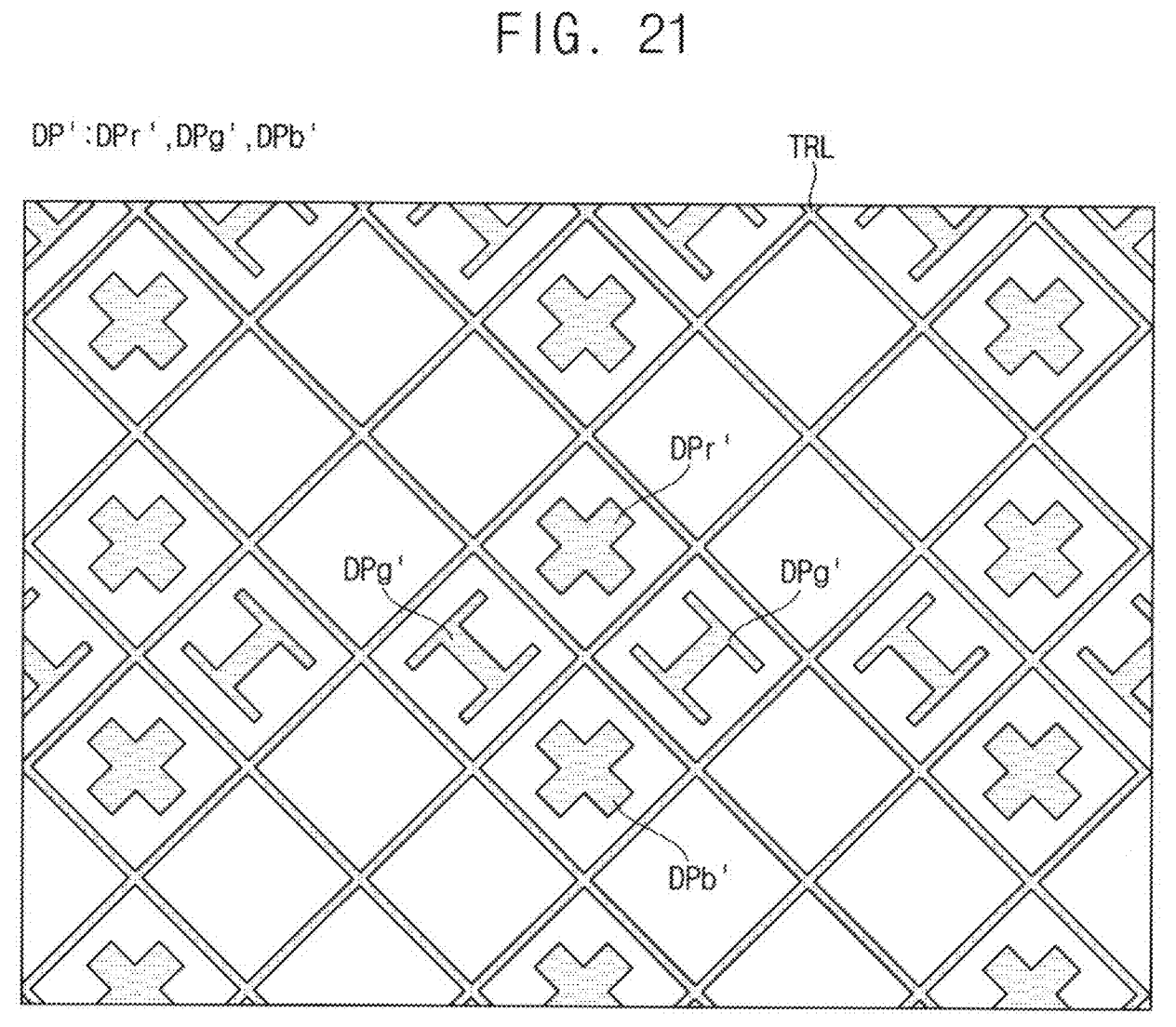

FIG. 19 is an enlarged plan view showing a partial region S2$a'$ of the touch sensing layer S2 of FIG. 1. FIG. 20 is a plan view for describing a dummy pattern DP disposed in the partial region S2$a'$ of the touch sensing layer S2, and FIG. 21 is a plan view for describing a sensing pattern TRL and a dummy sensing pattern DP' disposed in the partial region S2$a'$ of the touch sensing layer S2. A partial region S2$a'$ of the touch sensing layer S2 may be a region overlapping the partial region S1$a$ of the pixel layer S1 described with reference to FIG. 2 and the partial region S3$a$ of the light blocking layer S3 described with reference to FIG. 6, in which a portion of an electrode among the sensing electrodes RX and the driving electrodes TX of FIG. 1 is shown.

Referring to FIGS. 19 to 21, a dummy pattern DP, a sensing pattern TRL, and a dummy sensing pattern DP' may be disposed in the partial region S2$a'$ of the touch sensing layer S2. In other words, each of the sensing electrodes RX and the driving electrodes TX may include a dummy pattern DP, a sensing pattern TRL, and a dummy sensing pattern DP'.

The dummy pattern DP and the sensing pattern TRL may be substantially the same as the dummy pattern DP and the sensing pattern TRL, which have been described with reference to FIGS. 3 to 5. Therefore, redundant descriptions thereof will be omitted.

The dummy sensing pattern DP' may be disposed on the same layer as the sensing pattern TRL. For example, the dummy sensing pattern DP' and the sensing pattern TRL may be disposed on an insulating layer (e.g., YIL2 of FIG. 23).

The dummy sensing pattern DP' may substantially completely overlap a portion of the dummy pattern DP when viewed in a plan view. In this case, at least a portion of the dummy sensing pattern DP' may be disposed between two dummy openings that are adjacent to each other among the dummy openings DPO when viewed in a plan view.

For example, the dummy sensing pattern DP' may include: a first dummy sensing pattern DPr' that substantially completely overlaps a portion of the first dummy pattern DPr when viewed in a plan view; a second dummy sensing pattern DPg' that substantially completely overlaps a portion of the second dummy pattern DPg when viewed in a plan view; and a third dummy sensing pattern DPb' that substantially completely overlaps a portion of the third dummy pattern DPb when viewed in a plan view. In this case, the first dummy sensing pattern DPr' may be disposed between the first dummy openings DPOr, and the third dummy sensing pattern DPb' may be disposed between the third dummy openings DPOb. In addition, the second dummy sensing pattern DPg' may be disposed between the second dummy openings DPOg, and may surround at least one side of each of the second dummy openings DPOg when viewed in a plan view.

According to an embodiment, the dummy sensing pattern DP' may be electrically insulated from the sensing pattern TRL. For example, as shown in FIG. 21, the dummy sensing pattern DP' may be spaced apart from the sensing pattern TRL when viewed in a plan view, and the sensing pattern TRL may surround the dummy sensing pattern DP'.

Figure 22:
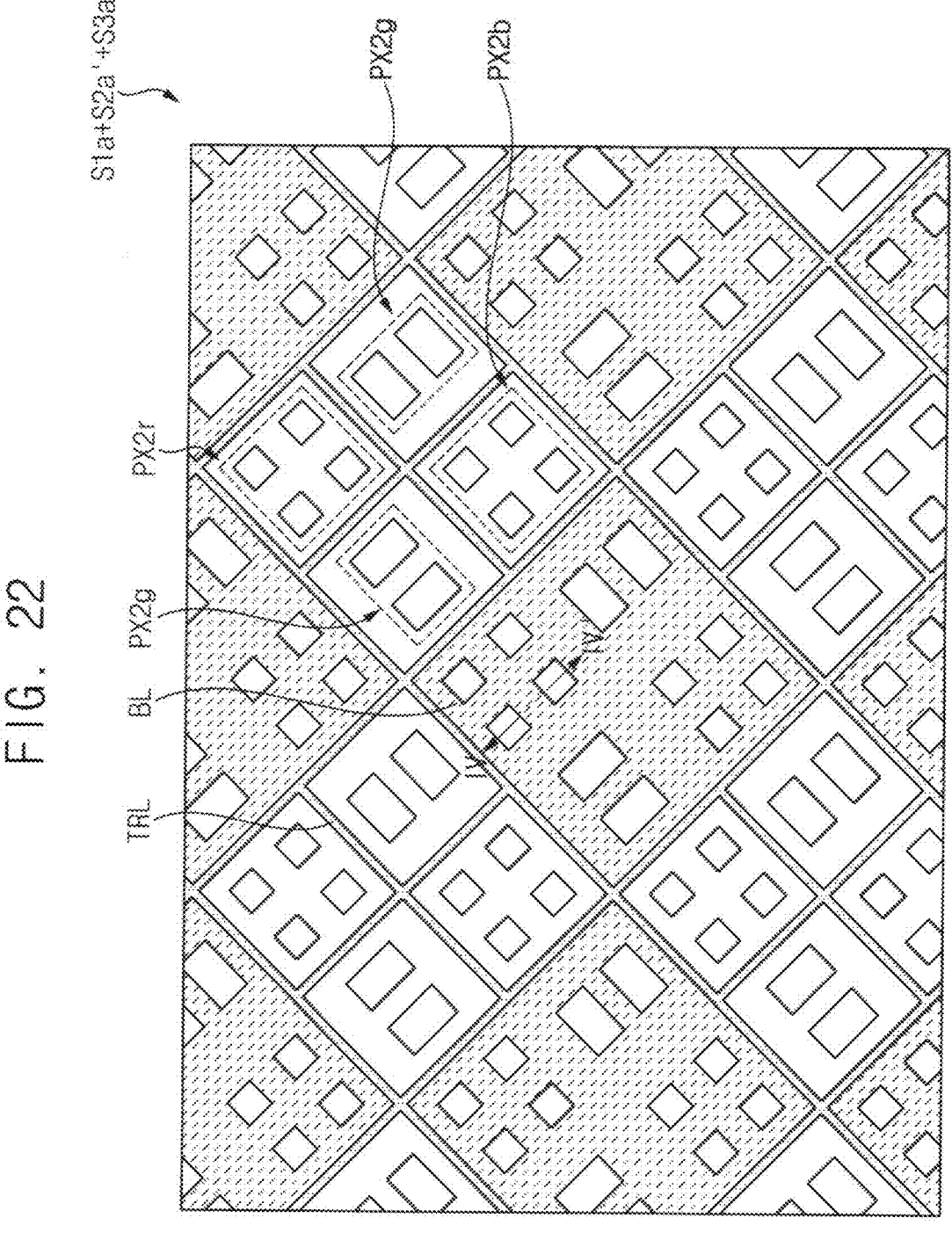
Figure 23:
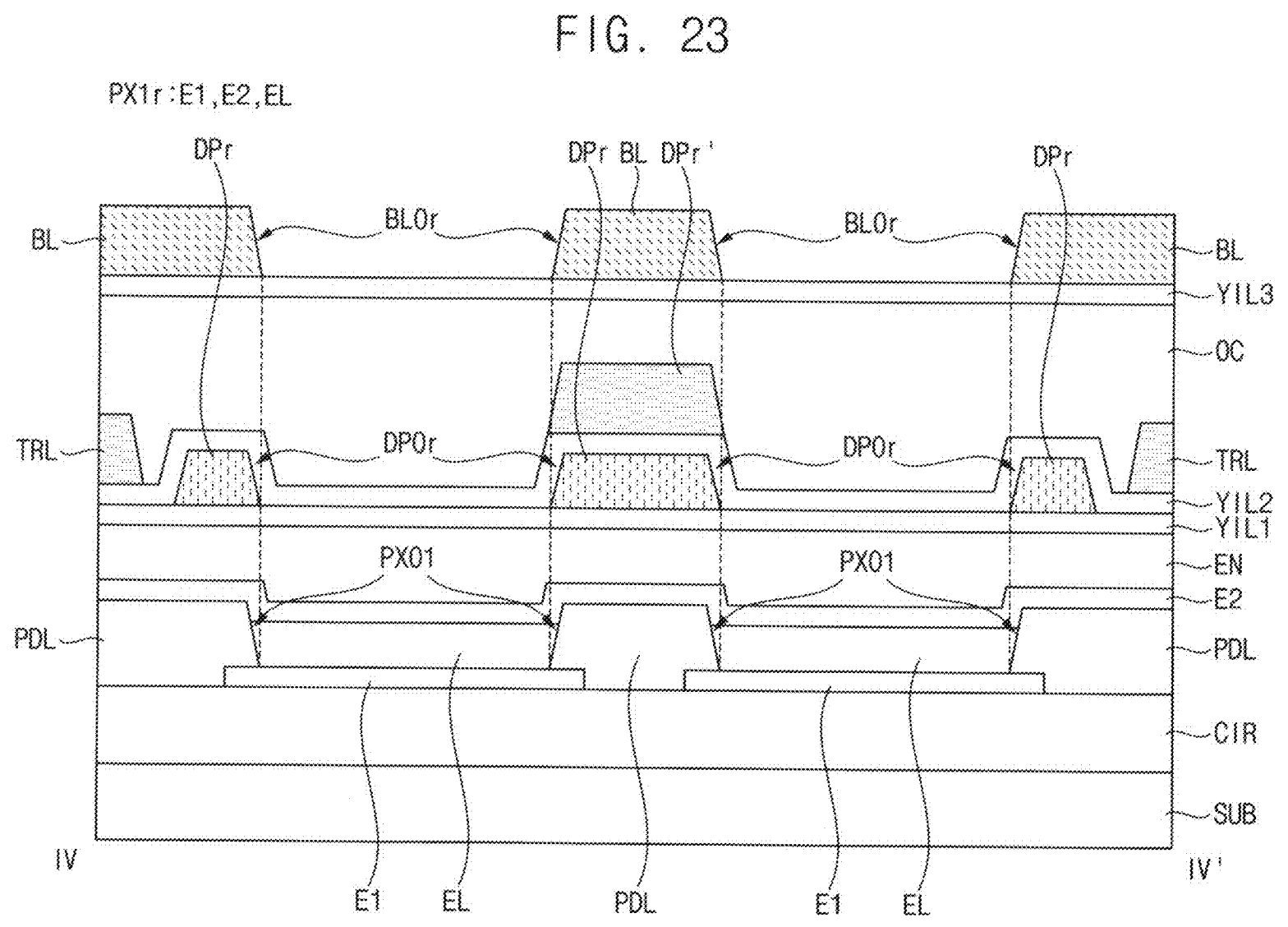

FIG. 22 is a plan view showing the configurations shown in FIGS. 2, 19, and 6 to overlap each other, and FIG. 23 is a cross-sectional view taken along a line IV-IV' of FIG. 22. FIG. 23 is a cross-sectional view showing two first red light emitting regions that are adjacent to each other among a plurality of first red light emitting regions EA1$r$.

Referring to FIGS. 22 and 23, the display device DD may include a substrate SUB, a circuit layer CIR, a first electrode E1, a pixel defining layer PDL, a light emitting material EL, a second electrode E2, an encapsulation layer EN, a first insulating layer YIL1, a first dummy pattern DPr, a second insulating layer YIL2, a sensing pattern TRL, a first dummy sensing pattern DPr', a coating layer OC, a third insulating layer YIL3, and a light blocking pattern BL.

The substrate SUB, the circuit layer CIR, the first electrode E1, the pixel defining layer PDL, the light emitting material EL, the second electrode E2, the encapsulation layer EN, the first insulating layer YIL1, the first dummy pattern DPr, the second insulating layer YIL2, the sensing pattern TRL, the coating layer OC, the third insulating layer YIL3, and the light blocking pattern BL may be substantially the same as the substrate SUB, the circuit layer CIR, the first electrode E1, the pixel defining layer PDL, the light emitting material EL, the second electrode E2, the encapsulation layer EN, the first insulating layer YIL1, the first dummy pattern DPr, the second insulating layer YIL2, the sensing pattern TRL, the coating layer OC, the third insulating layer YIL3, and the light blocking pattern BL, which have been described with reference to FIGS. 7 and 8. Therefore, redundant descriptions thereof will be omitted.

The first dummy sensing pattern DPr' may be disposed on the second insulating layer YIL2. The first dummy sensing pattern DPr' may substantially completely overlap the first dummy pattern DPr. The first dummy sensing pattern DPr' may be disposed between two first red light emitting regions that are adjacent to each other among the first red light emitting regions EA1$r$. Accordingly, the first dummy sensing pattern DPr' may prevent a light emitted from one of the two first red light emitting regions that are adjacent to each other from being mixed with a light emitted from the remaining one of the two first red light emitting regions.

Hereinafter, another portion of the display device according to another embodiment of the present disclosure will be described with reference to FIGS. 24 to 28.

Figure 24:
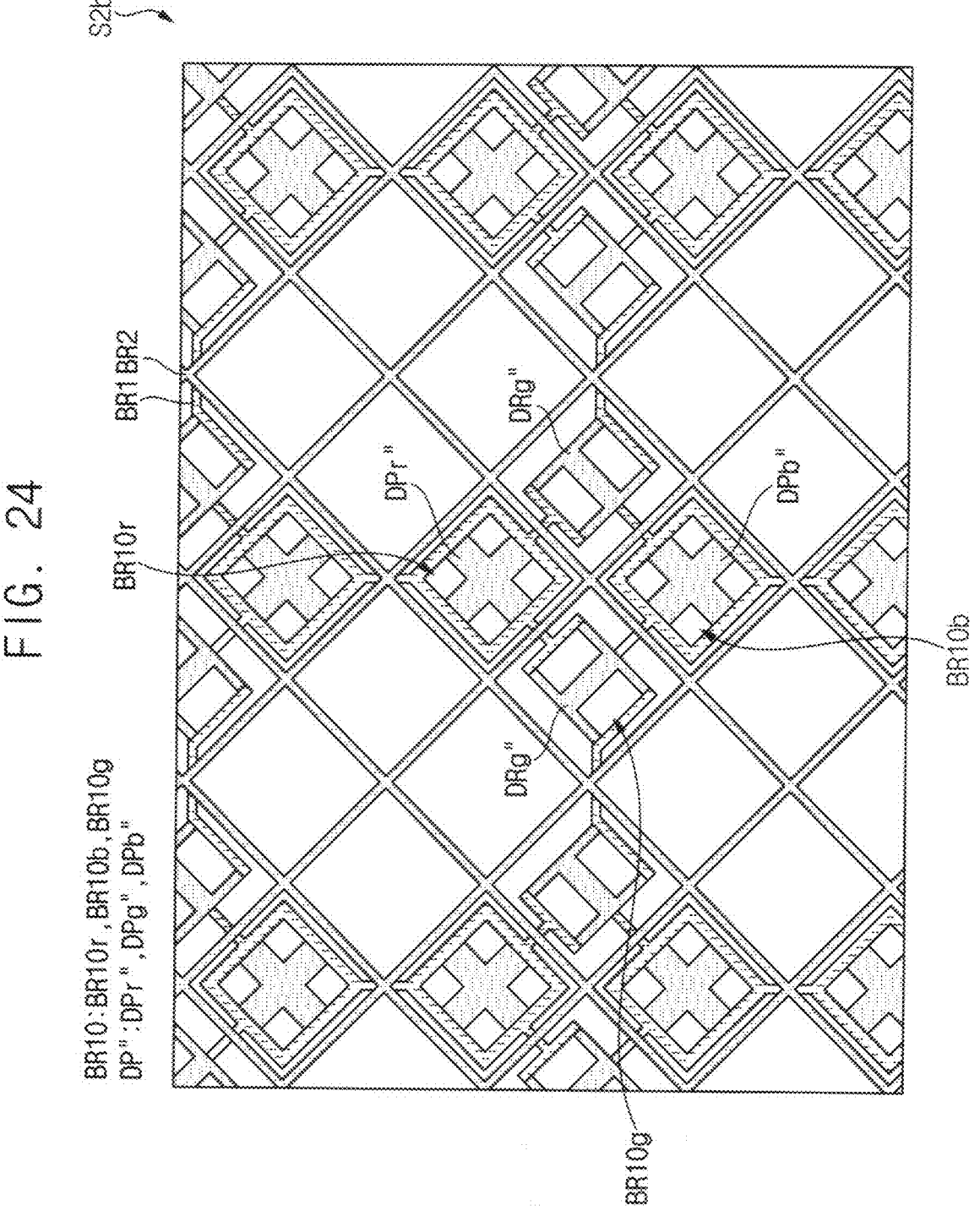
Figure 26:
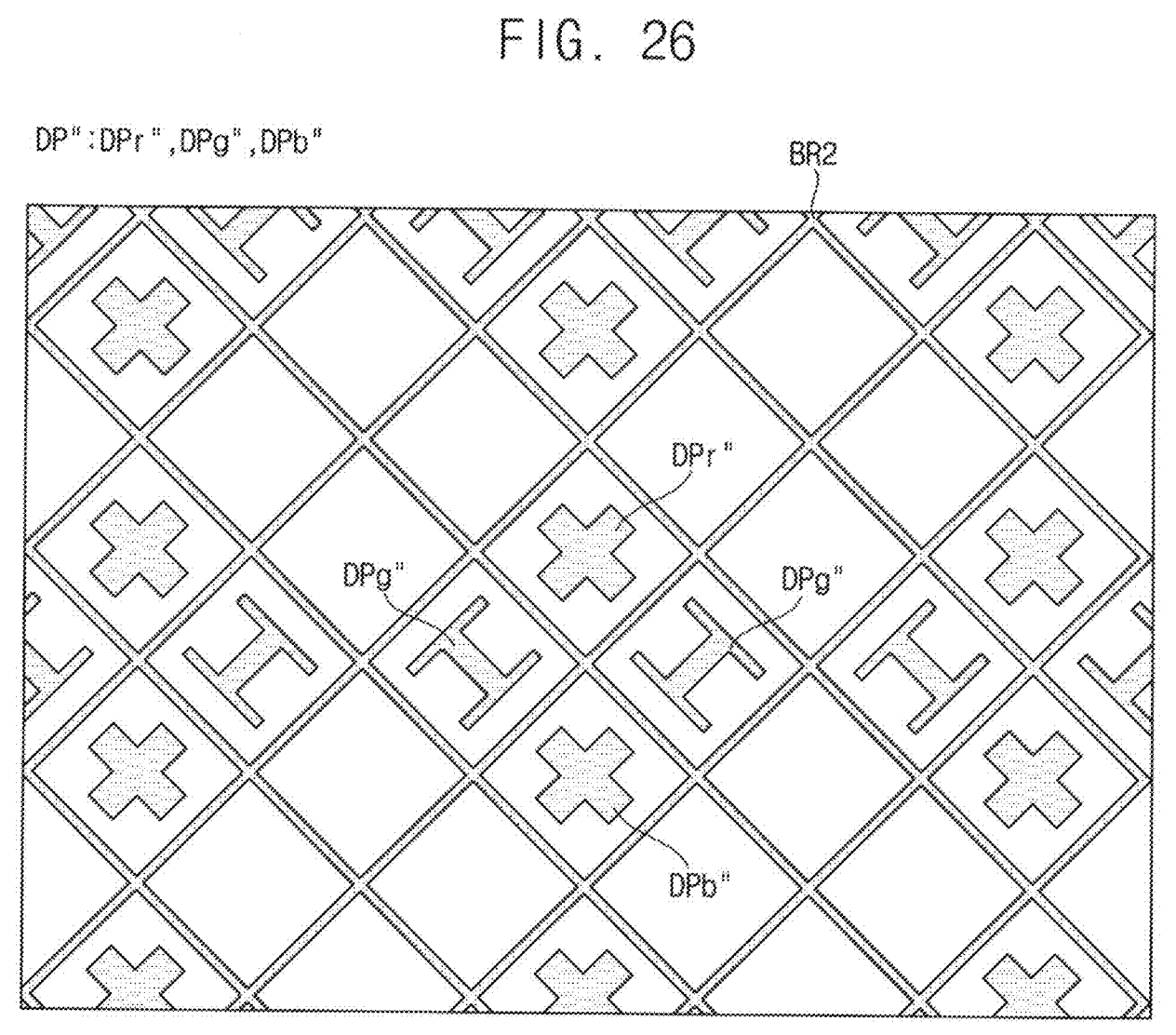

FIG. 24 is an enlarged plan view showing a partial region S2*b'* of the touch sensing layer S2 of FIG. 1. FIG. 25 is a plan view for describing a first bridge pattern BR1 disposed in the partial region S2*b'* of the touch sensing layer S2, and FIG. 26 is a plan view for describing a second bridge pattern BR2 and a dummy bridge pattern DP''' disposed in the partial region S2*b'* of the touch sensing layer S2. A partial region S2*b'* of the touch sensing layer S2 may be a region overlapping the partial region S1*b* of the pixel layer S1 described with reference to FIG. 12 and the partial region S3*b* of the light blocking layer S3 described with reference to FIG. 16, in which a portion of a region where the first bridge electrodes BR_RX and the second bridge electrodes BR_TX of FIG. 1 overlap each other is shown.

Referring to FIGS. 24 to 26, a first bridge pattern BR1, a second bridge pattern BR2, and a dummy bridge pattern DP''' may be disposed in the partial region S2*b'* of the touch sensing layer S2.

According to an embodiment, each of the first bridge electrodes BR_RX may include a first bridge pattern BR1, and each of the second bridge electrodes BR_TX may include a second bridge pattern BR2 and a dummy bridge pattern DP'''. In this case, the sensing signal may be provided to the first bridge pattern BR1, and the driving signal may be provided to the second bridge pattern BR2.

According to another embodiment, each of the first bridge electrodes BR_RX may include a second bridge pattern BR2 and a dummy bridge pattern DP''', and each of the second bridge electrodes BR_TX may include a first bridge pattern BR1. In this case, the driving signal may be provided to the first bridge pattern BR1, and the sensing signal may be provided to the second bridge pattern BR2.

The first bridge pattern BR1 and the second bridge pattern BR2 may be substantially the same as the first bridge pattern BR1 and the second bridge pattern BR2, which have been described with reference to FIGS. 13 to 15. Therefore, redundant descriptions thereof will be omitted.

The dummy bridge pattern DP''' may be disposed on the same layer as the second bridge pattern BR2. For example, the dummy bridge pattern DP''' and the second bridge pattern BR2 may be disposed on an insulating layer (e.g., YIL2 of FIG. 28).

The dummy bridge pattern DP''' may substantially completely overlap a portion of the first bridge pattern BR1 when viewed in a plan view. In this case, at least a portion of the dummy bridge pattern DP''' may be disposed between two dummy openings that are adjacent to each other among the dummy openings BR1O when viewed in a plan view.

For example, the dummy bridge pattern DP''' may include: a first dummy bridge pattern DPr''' that substantially completely overlaps a portion of the first dummy pattern BR1*r* when viewed in a plan view; a second dummy bridge pattern DPg''' that substantially completely overlaps a portion of the second dummy pattern BR1*g* when viewed in a plan view; and a third dummy bridge pattern DPb''' that substantially completely overlaps a portion of the third dummy pattern BR1*b* when viewed in a plan view. In this case, the first dummy bridge pattern DPr''' may be disposed between the first dummy openings BR1Or, and the third dummy bridge pattern DPb''' may be disposed between the third dummy openings BR1Ob. In addition, the second dummy bridge pattern DPg''' may be disposed between the second dummy openings BR1Og, and may surround at least one side of each of the second dummy openings DPOg when viewed in a plan view.

According to an embodiment, the dummy bridge pattern DP''' may be electrically insulated from the second bridge pattern BR2. For example, as shown in FIG. 26, the dummy bridge pattern DP''' may be spaced apart from the second bridge pattern BR2 when viewed in a plan view, and the second bridge pattern BR2 may surround the dummy bridge pattern DP'''.

Figure 27:
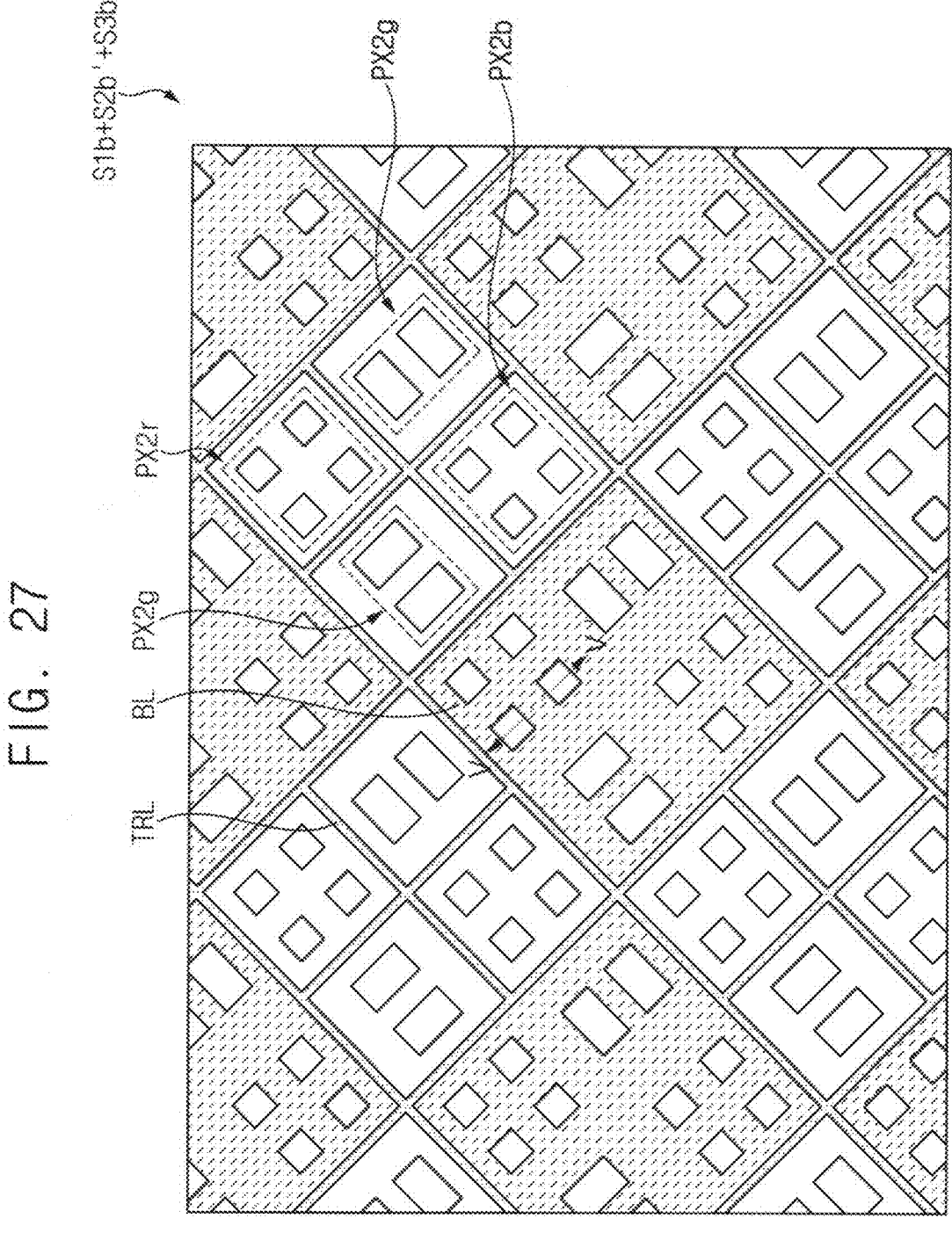
Figure 28:
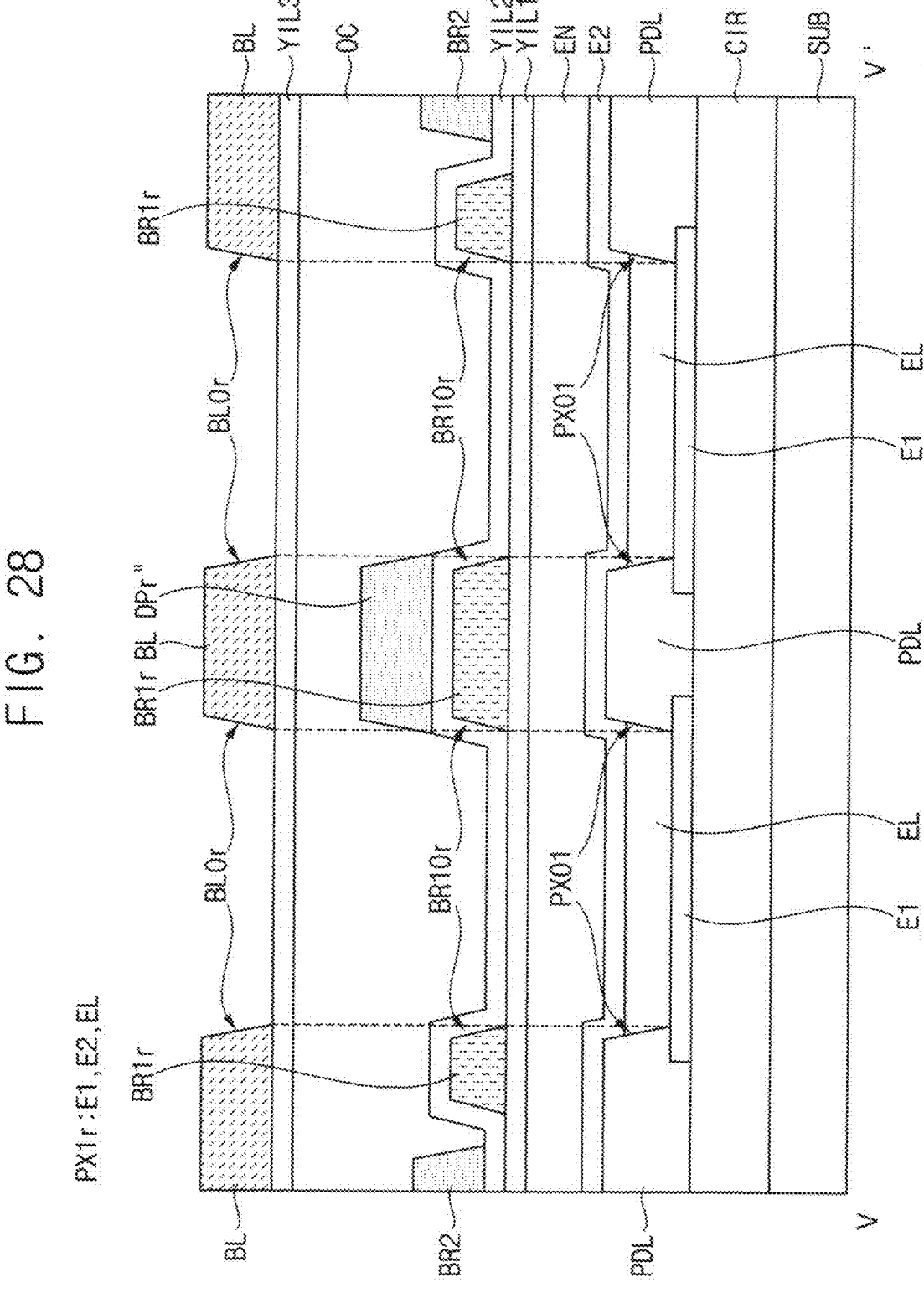

FIG. 27 is a plan view showing the configurations shown in FIGS. 12, 24, and 16 to overlap each other, and FIG. 28 is a cross-sectional view taken along a line V-V' of FIG. 27. FIG. 28 is a cross-sectional view showing two first red light emitting regions that are adjacent to each other among a plurality of first red light emitting regions EA1*r*.

Referring to FIGS. 27 and 28, the display device DD may include a substrate SUB, a circuit layer CIR, a first electrode E1, a pixel defining layer PDL, a light emitting material EL, a second electrode E2, an encapsulation layer EN, a first insulating layer YIL1, a first dummy pattern BR1*r*, a second insulating layer YIL2, a second bridge pattern BR2, a first dummy bridge pattern DPr''', a coating layer OC, a third insulating layer YIL3, and a light blocking pattern BL.

The substrate SUB, the circuit layer CIR, the first electrode E1, the pixel defining layer PDL, the light emitting material EL, the second electrode E2, the encapsulation layer EN, the first insulating layer YIL1, the first dummy pattern BR1*r*, the second insulating layer YIL2, the second bridge pattern BR2, the coating layer OC, the third insulating layer YIL3, and the light blocking pattern BL may be substantially the same as the substrate SUB, the circuit layer CIR, the first electrode E1, the pixel defining layer PDL, the light emitting material EL, the second electrode E2, the encapsulation layer EN, the first insulating layer YIL1, the first dummy pattern BR1*r*, the second insulating layer YIL2, the second bridge pattern BR2, the coating layer OC, the third insulating layer YIL3, and the light blocking pattern BL, which have been described with reference to FIGS. 17 and 18. Therefore, redundant descriptions thereof will be omitted.

The first dummy bridge pattern DPr''' may be disposed on the second insulating layer YIL2. The first dummy bridge pattern DPr''' may substantially completely overlap the first dummy pattern BR1*r*. The first dummy bridge pattern DPr''' may be disposed between two first red light emitting regions that are adjacent to each other among the first red light emitting regions EA1*r*. Accordingly, the first dummy bridge pattern DPr''' may prevent a light emitted from one of the two first red light emitting regions that are adjacent to each other from being mixed with a light emitted from the remaining one of the two first red light emitting regions.

Although exemplary embodiments of the present disclosure have been described above, it will be understood by those of ordinary skill in the art that various changes and modifications can be made to the present disclosure without departing from the spirit and scope of the present disclosure as set forth in the appended claims.

The present disclosure may be applied to various display devices. For example, the present disclosure may be applied to various display devices such as display devices for vehicles, ships, and aircraft. portable communication devices, display devices for exhibition or information transmission, and medical display devices.

What is claimed is:

1. A display device comprising:
first pixel units arranged in a first direction and a second direction intersecting the first direction, each including a first sub-pixel, a second sub-pixel, and a third sub-pixel configured to emit light of different wavelength bands;
second pixel units spaced apart from the first pixel units and arranged in the first direction and the second direction, each including a fourth sub-pixel, a fifth sub-pixel, and a sixth sub-pixel configured to emit light of different wavelength bands;
a first light blocking pattern surrounding the first pixel units and overlapping at least a portion of the first pixel units when viewed in a plan view; and
a second light blocking pattern surrounding the first pixel units, overlapping at least a portion of the first pixel units when viewed in a plan view, and spaced apart from the second pixel units when viewed in a plan view,
wherein the second sub-pixel includes a first-second sub-pixel and a second-second sub pixel spaced apart from the first-second sub-pixel in the first direction,
the fifth sub-pixel includes a first-fifth sub-pixel and a second-fifth sub-pixel spaced apart from the first-fifth sub-pixel in the first direction,
the first-second sub-pixel and the second-fifth sub-pixel are alternately arranged in the second direction, and
the second-second sub-pixel and the first-fifth sub-pixel are alternately arranged in the second direction.

2. The display device of claim 1, wherein
the first pixel units and the second pixel units are alternately arranged in a third direction intersecting each of the first direction and the second direction.

3. The display device of claim 2, wherein
the first sub-pixel is spaced apart from the first-second sub-pixel in the third direction,
the second-second sub-pixel is spaced apart from the third sub-pixel in the third direction,
the fourth sub-pixel is spaced apart from the first-fifth sub-pixel in the third direction, and
the second-fifth sub-pixel is spaced apart from the sixth sub-pixel in the third direction.

4. The display device of claim 2, wherein
the second-second sub-pixel is spaced apart from the sixth sub-pixel in the third direction, and
the second-fifth sub-pixel is spaced apart from the third sub-pixel in the third direction.

5. The display device of claim 2, wherein
the first sub-pixel is spaced apart from the third sub-pixel in the second direction, and
the fourth sub-pixel is spaced apart from the sixth sub-pixel in the second direction.

6. The display device of claim 1, wherein
the first light blocking pattern defines a first opening overlapping at least a portion of each of the first sub-pixel, the second sub-pixel, and the third sub-pixel when viewed in a plan view, and a second opening overlapping at least a portion of each of the fourth sub-pixel, the fifth sub-pixel, and the sixth sub-pixel when viewed in a plan view, and
the second light blocking pattern defines a third opening overlapping at least a portion of each of the first sub-pixel, the second sub-pixel, and the third sub-pixel when viewed in a plan view.

7. The display device of claim 6, wherein the first opening and the third opening at least partially overlap when viewed in a plan view.

8. The display device of claim 6, wherein
each of the first pixel units includes a light emitting region in which light is substantially emitted, and
an area of the third opening is greater than or equal to an area of the light emitting region when viewed in a plan view.

9. The display device of claim 8, wherein
the first light emitting region includes:
a first light emitting region in which light is substantially emitted from the first sub-pixel;
a second light emitting region in which light is substantially emitted from the second sub-pixel; and
a third light emitting region in which light is substantially emitted from the third sub-pixel, and
the first light blocking pattern includes:
a first-first light blocking pattern defining a first-first opening overlapping the first light emitting region when viewed in a plan view;
a second-first light blocking pattern defining a second-first opening overlapping the second light emitting region when viewed in a plan view; and
a third-first light blocking pattern defining a third-first opening overlapping the third light emitting region when viewed in a plan view.

10. The display device of claim 9, wherein the first-first light blocking pattern, the second-first light blocking pattern, and the third-first light blocking pattern are connected to each other.

11. The display device of claim 1, wherein the first light blocking pattern and the second light blocking pattern at least partially overlap when viewed in a plan view.

12. The display device of claim 1, wherein
the first sub-pixel emits light in a red wavelength band,
the second sub-pixel emits light in a green wavelength band, and
the third sub-pixel emits light in a blue wavelength band.

13. The display device of claim 1, wherein
the fourth sub-pixel emits light in a red wavelength band,
the fifth sub-pixel emits light in a green wavelength band, and
the sixth sub-pixel emits light in a blue wavelength band.

* * * * *